United States Patent [19]

Namba

[11] Patent Number: 5,219,707
[45] Date of Patent: Jun. 15, 1993

[54] PHOTOSTABLE CYANINE DYE AND OPTICAL RECORDING MEDIUM

[75] Inventor: Kenryo Namba, Tokyo, Japan
[73] Assignee: TDK Corporation, Tokyo, Japan
[21] Appl. No.: 544,013
[22] Filed: Jun. 26, 1990

Related U.S. Application Data

[63] Continuation of Ser. No. 312,359, Feb. 14, 1989, abandoned, which is a continuation of Ser. No. 048,480, May 6, 1987, abandoned, which is a continuation of Ser. No. 676,075, Nov. 29, 1984, abandoned.

[30] Foreign Application Priority Data

| Jan. 12, 1983 | [JP] | Japan | 58-227550 |
| Jan. 12, 1983 | [JP] | Japan | 58-227551 |
| Mar. 2, 1984 | [JP] | Japan | 59-18878 |
| Apr. 2, 1984 | [JP] | Japan | 59-19715 |

[51] Int. Cl.$^5$ ............................................. G03C 1/76
[52] U.S. Cl. ................................... 430/270; 430/495; 430/945
[58] Field of Search ........................ 430/270, 495, 945

[56] References Cited

U.S. PATENT DOCUMENTS

| 4,050,938 | 9/1977 | Smith et al. | 430/581 |
| 4,465,767 | 8/1984 | Oba et al. | 430/495 |
| 4,626,496 | 12/1986 | Sato . | |
| 4,652,514 | 3/1987 | Abe et al. | 430/343 |

FOREIGN PATENT DOCUMENTS

| 59-24692 | 2/1984 | Japan | 430/495 |
| 59-67092 | 4/1984 | Japan | 430/495 |
| 59-78341 | 5/1984 | Japan | 430/495 |

OTHER PUBLICATIONS

Namba et al., U.S. Application 07/143312 originally filed Jul. 29, 1983.
Colour Index, 3rd edition, vol. 4, published by The Society of Dyers and Colourists, 1971, p. 4438 and p. 4440.
Research Disclosure, 21612, Apr. 1982, pp. 117–118.

*Primary Examiner*—Charles L. Bowers, Jr.
*Assistant Examiner*—Martin Angebranndt
*Attorney, Agent, or Firm*—Wyatt, Gerber, Burke and Badie

[57] ABSTRACT

A photostable cyanine dye possessing a structure represented by the general formula I or II:

$$\phi^+ L = \Psi \cdot Q^- \quad (I)$$

$$\phi = L - \Psi^+ \cdot Q^- \quad (II)$$

wherein $\phi$ denotes a monovalent or divalent residue of thiazole ring, oxazole ring, selenazole ring, imidazole ring, pyridine ring, indolenine ring, benzoindolenine ring or dibenzoindolenine ring which may have an aromatic ring condensed thereto, $\Psi$ denotes a divalent or monovalent residue of thiazole ring, oxazole ring, selenazole ring, imidazole ring, pyridine ring, indolenine ring, benzoindolenine ring or dibenzoindolenine ring which may have an aromatic ring condensed thereto, L denotes a polymethine connecting group for the formation of a cyanine dye, and $Q^-$ denotes an anion represented by the general formula III:

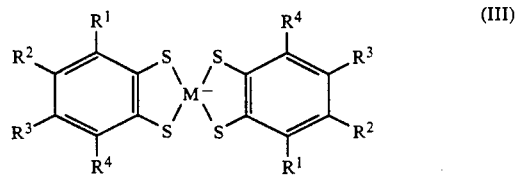

(III)

wherein M denotes a transition metal atom, $R^1$, $R^2$, $R^3$ and $R^4$ each denote a hydrogen atom, a halogen atom, an alkyl group, or a dialkylamino group and preparation thereof, and an optical recording medium according to Claim 18, wherein said photostable cyanine dye possesses a structure represented by the general formula I or II.

$$\phi^+ - L = \Psi \cdot Q^- \quad (I)$$

$$\phi = L - \Psi^+ \cdot Q^- \quad (II)$$

wherein $\phi$, $\Psi$, L and $Q^-$ have the same meanings as defined above.

12 Claims, No Drawings

PHOTOSTABLE CYANINE DYE AND OPTICAL RECORDING MEDIUM

CONTINUING DATA

This application is a continuation of application Ser. No. 07/312,359, filed Feb. 14, 1989, now abandoned, which is a continuation of application Ser. No. 07/048,480, filed May 6, 1987, now abandoned, which is a continuation of application Ser. No. 06/676,075, filed Nov. 29, 1984, now abandoned.

BACKGROUND OF THE INVENTION

1. Field of the Invention

This invention relates to a novel photostable cyanine dye, to a method for the production thereof, and to an optical recording medium using the dye, particularly a heat mode optical recording medium.

2. Description of Prior Art

Cyanine dyes are used in various fields. Typical application in which they are used include silver halide photographs, dye lasers, electrophotographic sensitizers, and optical recording media.

Especially, cyanine dyes of the indolenine type are ideally suitable for optical recording media for reasons such as high solubility and low crystallinity (Japanese Patent Application SHO 57(1982)-134397, SHO 57(1982)-134170, SHO 57(1982)-17776, etc.). Unfortunately, cyanine dyes of the indolenine type have a disadvantage that they are easily discolored because of their poor resistance to light.

During the course of my study devoted to the solution of the problem of the discoloration of cyanine dye used in the recording layer of a heat mode optical recording medium in the form of a film cured by repeated exposure of the recording layer to the reading light (degradation by reading), I have already proposed highly satisfactory solutions of this problem of degradation by reading by the incorporation of quenchers of the bisphenyl dithiol type (Japanese Patent Application SHO 58(1983)-163,080, SHO 57(1982)-166,832, SHO 57(1982)-168,048 and SHO 57(1982)-7,776).

For the improvement of the resistance of cyanine dye to light, however, the method depending on the mixture of the cyanine dye with a quencher is effective only to a limited extent because the molecules of the dye are not necessarily joined as strongly to the added quencher as expected.

The cyanine dye is generally in the form of a cation coupled with an acid anion and the quencher is generally in the form of an anion coupled with an onium cation. The mixture, therefore, entails the possibility that, owing to the acid anion and the onium cation, the dye and the quencher will undergo hydrolysis and bring about such adverse effects as degradation of the resistance to moisture, for example.

Further, the acid anion and the onium cation have an effect of diluting the dye and causing the reflectivity of the film to fall below the value proper to the cyanine dye with the result that the reproducing S/N ratio decreases.

The optical recording medium is such that the medium itself is not brought into contact with the writing or reading head and, therefore, is characterized by enjoying freedom from deterioration caused by wear. This strong point has encouraged various studies directed to development of optical recording media.

In the optical recording media, those of the heat mode are commanding particular interest of researchers because they do not need darkroom treatment for development.

The heat mode optical recording medium is an optical recording medium which utilizes the recording light in the form of heat. For example, the pit-forming type optical recording medium is based on the procedure of writing given information on the medium by forming small holes called pits by the removal of part of the medium with a recording light such as a laser and reading the recorded information by sensing these pits with a reading light.

In the pit-forming type medium of this operating principle, particularly of the kind using a semiconductor laser permitting miniaturization of device, the recording layer is formed principally of a material composed mainly of Te.

In recent years, numerous proposals and reports have come to cover those media which use recording layers of organic materials composed mainly of dyes in the place of Te because Te type materials are harmful and require more thorough sensitization and the cost of production must be lowered.

Among the organic materials in the recording layers which require the He-Ne laser for the formation of pits, those using squalirium dyes [Japanese Patent Application Laid-open SHO 56(1981)-46,221 and V. B. Jipson and C. R. Jones.: J. Vac. Sci. Technol., 18, (1) 105 (1981)] and those using metal phthalocyanine dyes (Japanese Patent Application Laid-open SHO 57(1982)-82,094 and SHO 57(1982)-82,095) are included.

Another such organic material which similarly requires the He-Ne laser uses a metal phthalocyanine dye (Japanese Patent Application Laid-open SHO 56(1981)-86,795).

These optical recording media invariably have their recording layers containing respective dyes deposited in the form of film by vacuum deposition and, in this sense, do not differ much from those using Te in terms of the production of recording medium.

Generally, since the laser beam impinging on the vacuum deposited film of dye has low reflectance, the recording medium using this film fails to obtain an ample S/N ratio in the usual widely employed method which derives read signals from variations (decreaes) in the amount of reflected light caused by bits.

When the optical recording medium is produced in the so-called air-sandwich type construction having a recording layer opposed to and joined fast to a transparent substrate so that writing and reading of information is effected through the substrate, the recording layer can be protected from deterioration without lowering the writing sensitivity and the recording density can be improved. Even this recording and reproducing method is impraticable with the vacuum deposited film of dye.

This is because, in the ordinary substrate made of transparent resin, the refractance has a fair value (1.5 in the case of polymethyl methacrylate) and the surface reflectance has a fairly large value(4% in the same resin) and the reflectance on the recording layer through the substrate is not more than about 6.0% in the case of polymethyl methacrylate, for example, and the recording layer which exhibits only a low reflectance, therefore, does not permit reliable detection of variations in the amount of reflected light.

For the purpose of improving the S/N ratio of reading of the recording layer formed of a vacuum deposited film of dye, generally a vacuum deposited reflecting film such as of Al is interposed between the substrate and the recording layer.

In this case, the vacuum deposited reflecting film is intended to increase the reflectance and improve the S/N ratio. By the formation of pits, the reflecting film is exposed to increase the reflectance or, at times, the reflecting film is removed to decrease the reflectance. As a matter of course, the recording and reproduction of information cannot be effected by the light passed through the substrate.

The recording media in which a recording layer composed of a dye and resin is formed by the spreading technique have also been disclosed such as, for example, the medium using a recording layer formed of IR-132 dye (made by Kodak) and polyvinyl acetate (Japanese Patent Application Laid-open SHO 55(1980)-161,690), the medium using a recording layer formed of 1,1'-diethyl-2,2'-tricarbocyanine-iodide and nitrocellulose (Japanese Patent Application Laid-open SHO 57(1982)-74,845), and the medium using a recording layer formed of 3,3'-diethyl-12-acetylthiatetra-carbocyanine and polyvinyl acetate.

These optical recording media also require interposition of a reflecting film between the substrate and the recording layer and, therefore, are as defective as those involving use of a vacuum deposited film of dye in respect that recording and reproduction are not obtained by the light projected from behind the substrate.

To realize an optical recording medium possessing a recording layer of an organic material which permits recording and reproduction by the light passed through the substrate and exhibits interchangeability with a medium possessing a recording layer of a Te-based material, the organic material itself is required to exhibit high reflectance.

In a very small fraction of the optical recording media so far developed, the recording layers of organic materials incorporated therein without interposition of any reflecting layer exhibit high reflectance.

There have appeared publications purporting that a vacuum deposited film of vanadyl phthalocyanine exhibits high reflectance [P. Kivits et al., Appl. Phys. Part A 26 (2) 101 (1981), Japanese Patent Application Laid-open SHO 55(1980)-97,033]. Despite the high reflectance which is possibly ascribable to the high subliming temperature of the compound, the film is noted to possess poor writing sensitivity.

It has been reported that cyanine dyes and merocyanine dyes of the thiazole type or quinoline type exhibit high writing sensitivity [Yamamoto et al.: Glossary of Manuscripts for the 27the Meeting of Applied Physics, lp-p-9 (1980)]. An invention based on this publication has been proposed under Japanese Patent Application Laid-open SHO 58(1983)-112,790 These dyes are impracticable, however, because the dyes, particularly when they are converted into applied layers of the form of film, exhibit low degrees of solubility in solvents, undergo crystallization readily, offer very poor stability to resist the reading light, and quickly discolor.

In view of the true state of affairs described above, the inventors have already proposed a single-layer film of a cyanine dye of the indolenine type which has high solubility in solvents, undergoes crystallization minimally, offers thermal stability, and enjoys high reflectance (Japanese Patent Application SHO 57(1982)-134,397 and SHO 57(1982)-134,170).

They have also proposed improvement of solubility and prevention of crystallization in the cyanine dyes of the indolenine type or the thiazole type, quinoline type, selenazole type, etc. by the incorporation of a long-chain alkyl group in the molecules thereof (Japanese Patent Application SHO 57(1982)-182,589 and SHO 57(1982)-177,776).

They have further proposed addition of transition metal compounds as quenchers to cyanine dye for the enhancement of photostability and particularly the prevention of decolorization by light (degradation by reading) (Japanese Patent Application SHO 57(1982)-166,832 and SHO 57(1982)-168,048).

Generally cyanine dyes are coupled with anions such as, for example, $ClO_4^-$. Ordinary transient metal chelate compounds as quenchers are coupled with cations such as, example, ammonium ion.

When cyanine dyes and quenchers described above are combined in recording layers, therefore, such unnecessary paired anions and paired cations are inevitably contained in the recording layers, and, on hydrolysis, they tend to produce acids and alkalis. Thus, these recording layers have posed a problem regarding the resistance to moisture. Further, the inclusion of such unnecessary moieties results in an increase of the molecular weights and a proportional decrease in the absorbance and reflectance per unit weight. Thus, the recording layers prove disadvantageous in term of enhancement of sensibility.

OBJECT OF THE INVENTION

An object of this invention, therefore, is to provide a novel photostable cyanine dye, a method for the production of the dye, and an optical recording medium using the dye.

Another object of this invention is to provide a novel photostable cyanine dye retaining the reflection property inherent in the film of a cyanine dye, excelling in resistance to light, and having a quencher directly coupled thereto without the inclusion of other anion or cation and method for the production of the cyanine dye.

A further object of this invention is to provide an optical recording medium possessing a cyanine dye-containing recording layer yielding minimally to deterioration by reading and excelling in resistance to moisture.

SUMMARY OF THE INVENTION

The objects described above are attained by a photostable cyanine having a structure represented by the general formula I or II:

  (I)

  (II)

wherein $\phi$ denotes a monovalent or divalent residue of thiazole ring, oxazole ring, selenazole ring, imidazole ring, pyridine ring, indolenine ring, benzoindolenine ring or dibenzoindolenine ring which may have an aromatic ring condensed thereto, $\Psi$ denotes a divalent or monovalent residue of a thiazole ring, oxazole ring, selenazole ring, imidazole ring, pyridine ring, indolenine ring, benzoindolenine ring or dibenzoindolenine ring which may have an aromatic ring condensed thereto, L denotes polymethine connecting group for the formation of a cyanine dye, and Q⁻ denotes an anion represented by the general formula III:

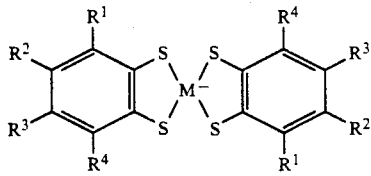

wherein M denotes a transition metal atom, $R^1$, $R^2$, $R^3$, and $R^4$ each denote a hydrogen atom, a halogen atom, an alkyl group, or a dialkylamino group.

The aforementioned objects are also attained by a method for the production of a photostable cyanine dye, which comprises the steps of causing a cyanine dye possessing a structure represented by the general formula IV or V to react with a quencher represented by the general formula VI in a polar organic solvent, then subjecting the resultant reaction product to double decomposition by addition of an aqueous solvent thereby producing a photostable cyanine dye represented by the general formula I or II, and isolating the cyanine dye from the resultant reaction mixture.

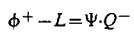 (I)

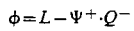 (II)

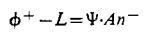 (IV)

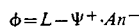 (V)

 (VI)

wherein $\phi$, $\Psi$, L and Q⁻ have the same meanings as define above, An⁻ denotes an anion, and Cat⁺ denotes an alkali metal cation or an onium cation.

The objects are also attained by an optical medium produced by forming on a substrate a recording layer containing a photostable cyanine dye which is the combination of a cyanine dye cation and a quencher and an anion.

DESCRIPTION OF PREFERRED EMBODIMENT

The novel photostable cyanine dye of the present invention is a single salt which is a product of the ionic bond between the cation of a specific cyanine dye and the anion of a specific quencher and possesses a chemical structure represented by the aforementioned general formula I or the general formula II isomeric therewith.

In the isomeric structures represented by the aforementioned general formulas I and II, $\phi$ denotes a monovalent or divalent residue of a thiazole ring, oxazole ring, selenazole ring, imidazole ring, pyridine ring, indolenine ring, benzoindolenine ring or dibenzoindolenine ring which may have condensed thereto an aromatic ring such as, for example, benzene ring, naphthalene ring, phenanthrene ring or quinoxaline ring. Preferably $\phi$ denotes

(wherein Z denotes an atomic group required for completion of an indolenine ring, benzoindolenine ring or dibenzoindolenine ring and $R_1$ denotes a substituted or unsubstituted alkyl, aryl or alkenyl group).

Then, $\Psi$ denotes a divalent or monovalent residue of a thiazole ring, oxazole ring, selenazole ring, imidazole ring, pyridine ring, indolenine ring, benzoindolenine ring or benzoindolenine ring which may have condensed thereto an aromatic ring such as benzene ring, naphthalene ring, phenanthrene ring or quinoxaline ring. Preferably $\Psi$ denotes

(wherein Z' denotes an atomic group required for completion of a substituted or unsubstituted alkyl, aryl, or alkenyl group).

The rings represented by $\phi$ and $\Psi$ may be identical to each other or otherwise.

The symbols $\phi^+$ and $\Psi^+$ denote the relevant rings wherein the nitrogen atoms possess a + charge and the symbols $\phi$ and $\Psi$ denote the relevant rings wherein the nitrogen atoms are neutral.

The backbone rings of $\phi$ and $\Psi$ are desired to be selected from among the rings of the formulas $\phi$I through $\phi$XVI, preferably the formulas $\phi$XIII through $\phi$XVI, and the rings of the formulas, $\Psi$I through $\Psi$XX, preferably the formulas $\Psi$XVIII through $\Psi$XX.

In the following formulas, the structures of $\phi$ and $\Psi$ are indicated respectively in the form of + − and $\Psi$ = as shown in the general formula I.

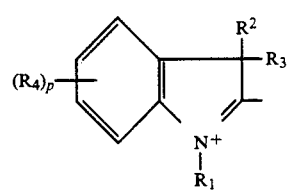 [$\phi$I]

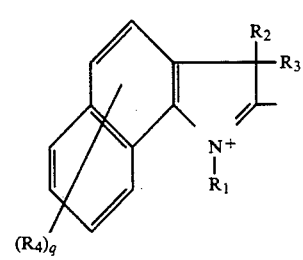 [$\phi$II]

-continued
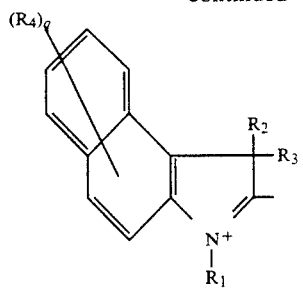
[φIII]
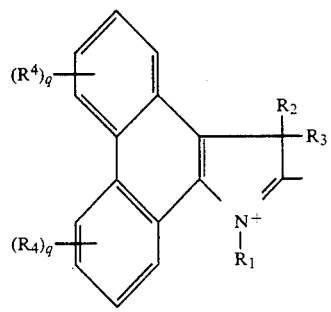
[φIV]
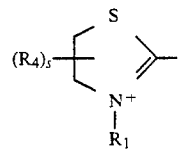
[φV]
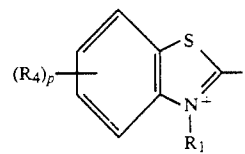
[φVI]
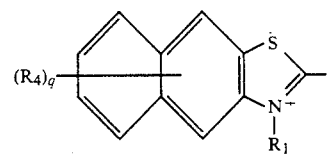
[φVII]
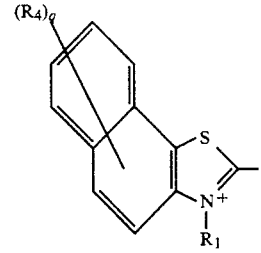
[φVIII]
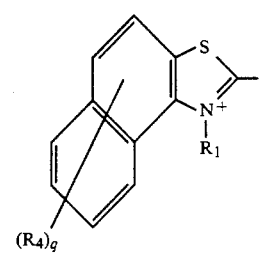
[φIX]
-continued
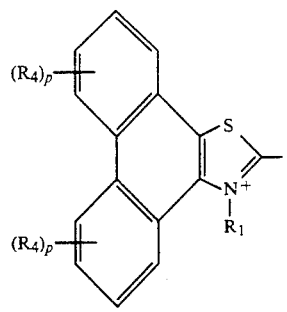
[φX]
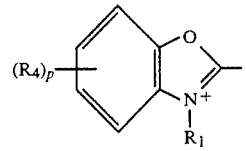
[φXI]
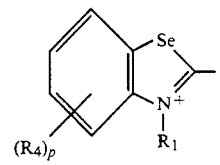
[φXII]
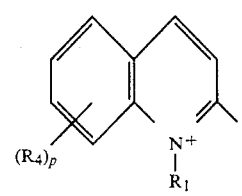
[φXIII]
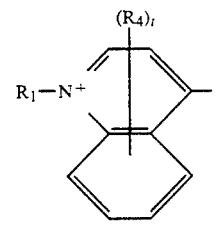
[φXIV]
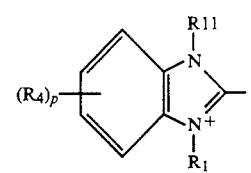
[φXV]
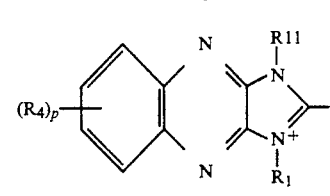
[φXVI]
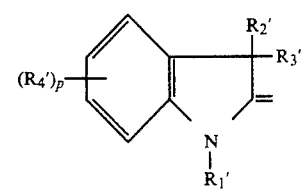
[ΨI]

-continued
[ΨII] 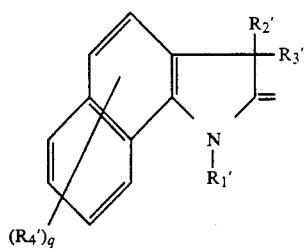
[ΨIII] 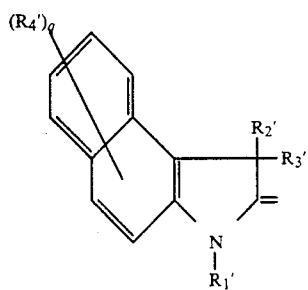
[ΨIV] 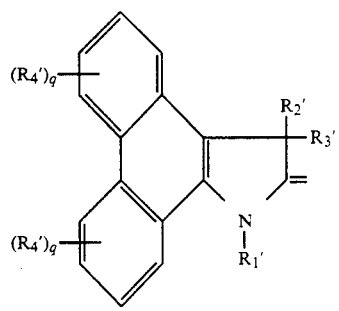
[ΨV] 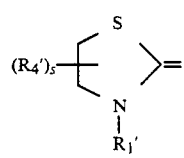
[ΨVI] 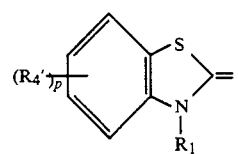
[ΨVII] 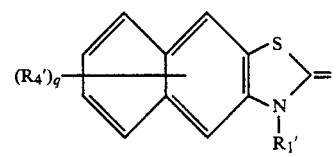
[ΨVIII] 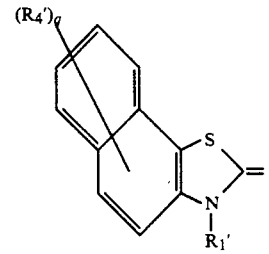
-continued
[ΨIX] 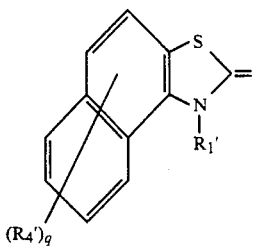
[ΨX] 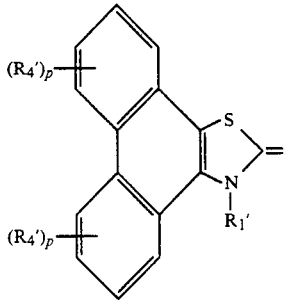
[ΨXI] 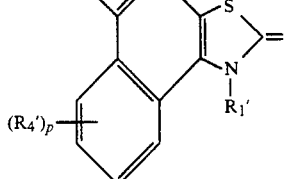
[ΨXII] 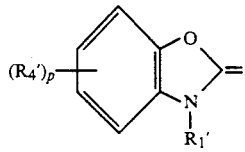
[ΨXIII] 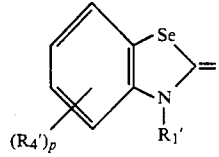
[ΨXIV] 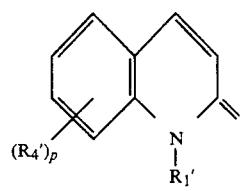
[ΨXV] 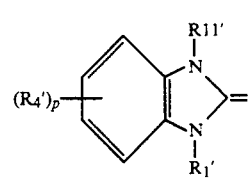

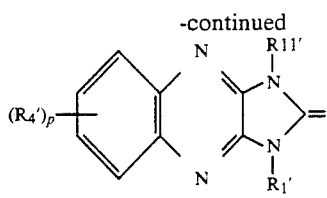 [ΨXVI]

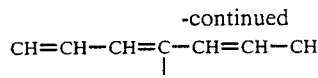 [LII]

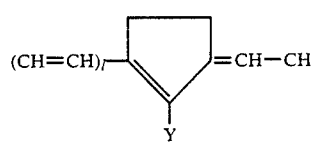 [LIII]

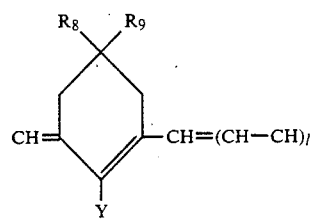 [LIV]

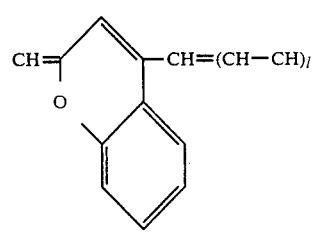 [LV]

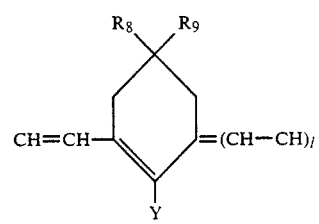 [LVI]

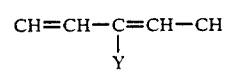 [LVII]

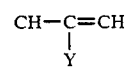 [LVIII]

 [LIX]

In the various rings enumerated above, the groups $R_1$ and $R_1'$ ($R_{11}$ and $R_{11}'$) bound to the nitrogen atom (two nitrogen atoms in the imidazole ring) in the ring each denote a substituted or unsubstituted alkyl group, aryl group or alkenyl group, preferably an alkyl group.

The numbers of carbon atoms in the groups $R_1$ and $R_1$, so bound to the nitrogen group in such groups are not particularly limited.

Where these groups $R_1$ and $R_1'$ further possess a substituent, the substituent may be any one member selected from the class consisting of sulfonic group, alkylcarbonyloxy group, alkylamide group, alkylsufonamide group, alkyloxycarbonyl group, alkylamino group, alkylcarbamoyl group, alkylsulfamoyl group, hydroxyl group, carboxy group and halogen atoms.

Among other permissible substituents, unsubstituted alkyl groups and alkyl groups substituted with alkylcarbonyloxy group, hydroxyl group, alkyloxycarbonyl group, carboxy group or sulfo group are particularly advantageous.

Where the ring of $\Psi(\Psi^+)$ is a condensed or uncondensed indolenine ring, it is desired to have two substituents $R_2'$ and $R_3'$ bound to the 3 position thereof.

The two substituents $R_2'$ and $R_3'$ so bound to the 3 position of the ring are desired to be each an alkyl group or an aryl group. Among other permissible substituents an unsubstituted alkyl group having 1 or 2, preferably 1, carbon atom.

The rings denotes by $\phi$ and $\Psi$ may have other substituents $R_4$, $R_4'$ bound to specific positions in the rings. Examples of the substituents so bound to the rings include alkyl group, aryl group, heterocyclic residue, halogen atoms, alkoxy group, aryloxy group, alkylthio group, arylthio group, alkylcarbonyl group, arylcarbonyl group, alkyloxycarbonyl group, aryloxycarbonyl group, alkylcarbonyloxy group, arylcarbonyloxy group, alkylamide group, arylamide group, alkylcarboamoyl group, arylcarbamoyl group, alkylamino group, arylamino group, carboxylic group, alkylsulfonyl group, arylsulfonyl group, alkylsulfonamide group, arylsulfonamide group, alkylsulfamoyl group, arylsulfamoyl group, cyano group and nitro group.

Generally, the numbers (p, q, r, s and t) of these substituents are 0 or about 1 to 4. Where p, q, r, s and t denote numbers exceeding 2, the plurality of $R_4$'s and ($R_4'$)'s may be different one another.

The cyanine dye cation possesses a condensed or uncondensed indolenine ring, excels in solubility, film-forming property, and stability, and exhibits extremely high reflectance.

The symbol L denotes a polymethine connecting group for the formation of a cyanine dye such as mono-, di-, tri- or tetracarbocyanine dye. It is particularly desired to be any one group selected from the group represented by the formulas L I through L VIII.

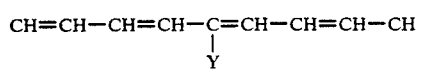 [LI]

In the formulas given above, Y denotes a hydrogen atom or a monovalent group. In this case, the monovalent group is desired to be one member selected from the class consisting of lower alkyl groups such as methyl group, ethyl group, etc., lower alkoxy groups such as methoxy group, ethoxy group, etc., di-substituted amino groups such as dimethylamino group, diphenylamino group, methylphenylamino group, morpholino group, imidazolizine group and ethoxycarbonyl-piperazine group, alkylcarbonyloxy groups such as acetoxy group, alkylthio groups such as methylthio group, cyano group, nitro group and halogen atoms such as Br and Cl.

$R_8$ and $R_9$ each denote a hydrogen atom or a lower alkyl group such as methyl group.

The symbol l denotes 0 or 1.

In the groups of these formula L I through L VIII, tricarbocyanine connecting groups, particularly those of the formulas L II, L, III, LIV, and L V, are desirable.

Now, concrete examples of the cyanine dye cations contemplated by the present invention will be cited below.

| | Φ | R₁ | R₂, R₃ | R₄ | ψ | R₁' | R₂', R₃' | R₄' | L | Y | |
|---|---|---|---|---|---|---|---|---|---|---|---|
| D⁺ 1 | ΦVI | C₂H₅ | | — | ψVI | C₂H₅ | | — | LII | H | — |
| D⁺ 2 | ΦVI | C₂H₅ | | 6-Cl | ψVI | C₂H₅ | | 6-Cl | LIII | N(C₆H₅)₂ | — |
| D⁺ 3 | ΦVI | C₈H₁₇ | | — | ψVI | C₈H₁₇ | | — | LII | H | — |
| D⁺ 4 | ΦVI | C₈H₁₇ | | 6-Cl | ψVI | C₈H₁₇ | | 6-Cl | LIII | H | — |
| D⁺ 5 | ΦVI | C₈H₁₇ | | 6-Cl | ψVI | C₈H₁₇ | | 6-Cl | LIII | N(C₆H₅)₂ | — |
| D⁺ 6 | ΦVII | C₈H₁₇ | | — | ψVII | C₈H₁₇ | | — | LIII | H | — |
| D⁺ 7 | ΦVII | C₂H₅ | | — | ψVII | C₂H₅ | | — | LIII | N(C₆H₅)₂ | — |
| D⁺ 8 | ΦXIV | C₂H₅ | | — | ψXIV | C₂H₅ | | — | LVIII | H | — |
| D⁺ 9 | ΦXIV | C₂H₅ | | — | ψXIV | C₂H₅ | | — | LVII | Cl | — |
| D⁺ 10 | ΦXIV | C₂H₅ | | — | ψXIV | C₂H₅ | | — | LVII | Cl | — |
| D⁺ 11 | ΦXIII | C₂H₅ | | — | ψXIII | C₂H₅ | | — | LIV | Br | (R⁸, R⁹ = H) |
| D⁺ 12 | ΦXIII | C₂H₅ | | — | ψXIII | C₂H₅ | | — | LII | H | — |
| D⁺ 13 | ΦXIII | CH₂COOC₂H₅ | | — | ψXIII | CH₂COOC₂H₅ | | — | LIX | H | — |
| D⁺ 14 | ΦXIII | C₂H₅ | | — | ψXIII | C₂H₅ | | — | LII | H | — |
| D⁺ 15 | ΦXVI | C₇H₁₅ | | — | ψXVI | C₇H₁₅ | | — | LIII | N(C₆H₅)₂ | — |
| D⁺ 16 | ΦXIII | CH₃ | | 6-C₂H₅O | ψXIII | CH₃ | | 6-C₂H₅O | LII | H | — |
| D⁺ 17 | ΦXIII | C₂H₅ | | 6-N(CH₃)₂ | ψXIII | C₂H₅ | | 6-N(CH₃)₂ | LVII | Cl | — |
| D⁺ 18 | ΦXIII | C₂H₅ | | 6-C₂H₅O | ψXIII | C₂H₅ | | 6-C₂H₅O | LVII | Cl | — |
| D⁺ 19 | ΦXIII | C₂H₅ | | — | ψXIII | C₂H₅ | | — | LIII | N(C₆H₅)₂ | — |
| D⁺ 20 | ΦXIII | C₁₈H₃₇ | | 6-C₂H₅O | ψXIII | C₁₈H₃₇ | | 6-C₂H₅O | LII | H | — |
| D⁺ 21 | ΦXIV | C₂H₅ | | — | ψXIV | C₂H₅ | | — | LII | H | — |
| D⁺ 22 | ΦXIV | CH₃ | | 5-CH₃ | ψXIV | CH₃ | | 5-CH₃ | LII | H | — |
| D⁺ 23 | ΦVI | C₂H₅ | | 5-CH₃ | ψVI | C₂H₅ | | 5-CH₃ | LII | H | — |
| D⁺ 24 | ΦVI | C₃H₇ | | 5-CH₃O | ψVI | C₃H₇ | | 5-CH₃O | LII | H | — |
| D⁺ 25 | ΦVI | C₂H₅ | | 5-CH₃O | ψVI | C₂H₅ | | 5-CH₃O | LVII | Cl | — |
| D⁺ 26 | ΦVI | C₂H₅ | | 6-CH₃O | ψVI | C₂H₅ | | 6-CH₃O | LVII | Cl | — |
| D⁺ 27 | ΦIX | C₂H₅ | | — | ψIX | C₂H₅ | | — | LII | H | — |
| D⁺ 28 | ΦVI | C₁₈H₃₇ | | 6-Cl | ψVI | C₁₈H₃₇ | | 6-Cl | LII | H | — |
| D⁺ 29 | ΦVI | C₁₈H₃₇ | | 6-Cl | ψVI | C₁₈H₃₇ | | 6-Cl | LIII | N(C₆H₅)₂ | — |
| D⁺ 30 | ΦVI | C₈H₁₇ | | 6-Cl | ψVI | C₈H₁₇ | | 6-Cl | LIII | N(C₆H₅)₂ | — |
| D⁺ 31 | ΦVI | C₁₈H₃₇ | | 6-Cl | ψII | C₁₈H₃₇ | | 6-Cl | LII | H | — |
| D⁺ 32 | ΦVI | CH₂CH₂OH | | — | ψVI | CH₂CH₂OH | | — | LII | H | — |
| D⁺ 33 | ΦVI | C₂H₅ | | — | ψVI | C₂H₅ | | — | LIII | N(C₆H₅)₂ | — |
| D⁺ 34 | ΦVIII | C₂H₅ | | — | ψVIII | C₂H₅ | | — | LIII | N(C₆H₅)₂ | — |
| D⁺ 35 | ΦIX | C₂H₅ | | — | ψIX | C₂H₅ | | — | LIII | N⟨NCOOC₂H₅⟩ | — |
| D⁺ 36 | ΦIV | C₂H₅ | | — | ψIV | C₂H₅ | | — | LIII | N⟨NCOOC₂H₅⟩ | — |
| D⁺ 37 | ΦIV | CH₃ | CH₃ | — | ψVIII | CH₃ | CH₃ | — | LII | H | — |
| D⁺ 38 | ΦIV | C₄H₉ | CH₃ | — | ψVIII | C₄H₉ | CH₃ | — | LII | H | — |
| D⁺ 39 | ΦIV | CH₃ | CH₃ | — | ψVIII | CH₃ | CH₃ | — | LIII | N(C₆H₅)₂ | 0 |

-continued

| | Φ | R₁ | R₂, R₃ | R₄ | ψ | R₁' | R₂', R₃' | R₄' | L | Y | |
|---|---|---|---|---|---|---|---|---|---|---|---|
| D+ 40 | ΦXIII | C₄H₉ | — | — | ψIII | C₄H₉ | CH₃ | — | LII | H | — |
| D+ 41 | ΦXIII | CH₃ | — | — | ψIII | CH₃ | CH₃ | — | LIII | N(C₆H₅)₂ | o |
| D+ 42 | ΦXIII | CH₂CH₂OCOCH₃ | — | — | ψIII | CH₂CH₂OCOCH₃ | CH₃ | — | LIII | N(C₆H₅)₂ | — |
| D+ 43 | ΦXI | CH₃ | — | — | ψI | CH₃ | CH₃ | — | LII | H | o |
| D+ 44 | ΦVI | CH₃ | — | — | ψI | CH₃ | CH₃ | — | LII | H | — |
| D+ 45 | ΦXIII | C₄H₉ | — | — | ψI | C₄H₉ | CH₃ | — | LIII | N(C₆H₅)₂ | — |
| D+ 46 | ΦXIII | C₈H₁₇ | — | — | ψI | C₈H₁₇ | CH₃ | — | LII | H | — |
| D+ 47 | ΦXIII | C₄H₉ | — | — | ψVI | CH₃ | CH₃ | — | LIII | N(C₆H₅)₂ | — |
| D+ 48 | ΦVI | CH₃ | — | — | ψI | CH₃ | CH₃ | — | LVII | H | — |
| D+ 49 | ΦVI | C₄H₉ | — | — | ψI | C₄H₉ | CH₃ | — | LII | H | — |
| D+ 50 | ΦVI | C₈H₁₇ | — | — | ψI | C₈H₁₇ | CH₃ | — | LIII | N(C₆H₅)₂ | — |
| D+ 51 | ΦVI | CH₃ | — | — | ψI | CH₃ | CH₃ | — | LIII | Br | — |
| D+ 52 | ΦXIII | C₂H₅ | — | — | ψI | C₂H₅ | CH₃ | — | LIV | N(C₆H₅)₂ | — |
| D+ 53 | ΦI | CH₃ | CH₃ | — | ψI | CH₃ | CH₃ | — | LII | H | — |
| D+ 54 | ΦI | C₂H₅ | CH₃ | 5-CH₃SO₂ | ψI | C₂H₅ | CH₃ | 5-CH₃SO₂ | LII | H | — |
| D+ 55 | ΦIII | CH₃ | CH₃ | — | ψVI | CH₃ | CH₃ | — | LIII | N(C₆H₅)₂ | — |
| D+ 56 | ΦIII | C₈H₁₇ | CH₃ | — | ψVIII | C₈H₁₇ | CH₃ | — | LII | H | — |
| D+ 57 | ΦIII | C₁₈H₃₇ | CH₃ | — | ψVIII | C₁₈H₃₇ | CH₃ | — | LII | H | — |
| D+ 58 | ΦIII | CH₃ | CH₃ | — | ψVIII | CH₃ | CH₃ | — | LIII | N(C₆H₅)₂ | (R⁸, R⁹ = H) |
| D+ 59 | ΦIII | CH₂CH₂OCOCH₃ | CH₃ | — | ψVIII | CH₂CH₂OCOCH₃ | CH₃ | — | LII | H | — |
| D+ 60 | ΦIII | CH₂CH₂OCOCH₃ | CH₃ | — | ψVIII | CH₂CH₂OCOCH₃ | CH₃ | — | LIII | N(C₆H₅)₂ | — |
| D+ 61 | ΦIII | CH₃ | CH₃ | — | ψVIII | CH₃ | CH₃ | — | LVI | Br | — |
| D+ 62 | ΦI | CH₃ | CH₃ | — | ψI | CH₃ | CH₃ | — | LII | H | — |
| D+ 63 | ΦII | CH₃ | CH₃ | — | ψII | CH₃ | CH₃ | — | LII | H | — |
| D+ 64 | ΦIII | C₄H₉ | CH₃ | — | ψVIII | C₄H₉ | CH₃ | — | LIII | H | — |
| D+ 65 | ΦI | CH₂CH₂OH | CH₃ | — | ψI | CH₂CH₂OH | CH₃ | — | LIII | N(C₆H₅)₂ | — |
| D+ 66 | ΦI | CH₂CH₂OH | CH₃ | — | ψI | CH₂CH₂OH | CH₃ | — | LII | H | — |
| D+ 67 | ΦI | C₄H₉ | CH₃ | — | ψI | C₄H₉ | CH₃ | — | LIII | N(C₆H₅)₂ | — |
| D+ 68 | ΦIII | CH₂CH₂OCOCH₃ | CH₃ | — | ψVIII | CH₂CH₂OCOCH₃ | CH₃ | — | LII | H | — |
| D+ 69 | ΦI | CH₃ | CH₃ | — | ψI | CH₃ | CH₃ | — | LVII | H | — |
| D+ 70 | ΦIII | CH₃ | CH₃ | — | ψI | CH₃ | CH₃ | — | LIII | N(C₆H₅)₂ | (R⁸, R⁹ = H) |
| D+ 71 | ΦI | CH₃ | CH₃ | — | ψI | CH₃ | CH₃ | — | LVI | Br | — |
| D+ 72 | ΦI | CH₃ | CH₃ | — | ψI | CH₃ | CH₃ | — | LII | H | — |
| D+ 73 | ΦI | CH₃ | CH₃, C₂H₅ | — | ψI | CH₃ | CH₃, C₂H₅ | — | LII | Cl | — |
| D+ 74 | ΦIII | CH₃ | CH₃ | 5-Cl | ψI | CH₃ | CH₃ | 5-Cl | LII | Cl | — |
| D+ 75 | ΦI | CH₃ | CH₃ | 5,6-Cl | ψI | CH₃ | CH₃ | 5,6-Cl | LII | H | — |
| D+ 76 | ΦI | CH₃ | CH₃ | 5-OC₂H₅ | ψI | CH₃ | CH₃ | 5-OC₂H₅ | LIII | N(C₆H₅)₂ | — |
| D+ 77 | ΦI | CH₃ | CH₃ | 5-CH₃CONH | ψI | CH₃ | CH₃ | 5-CH₃CONH | LII | H | — |
| D+ 78 | ΦI | CH₃ | CH₃ | 5,7-C₂H₅OOC | ψI | CH₃ | CH₃ | 5,7-C₂H₅OOC | LII | H | — |
| D+ 79 | ΦI | CH₃ | CH₃ | 5,7-Cl | ψI | CH₃ | CH₃ | 5,7-Cl | LII | H | — |
| D+ 80 | ΦI | CH₃ | CH₃ | 5,7-CH₃O₂S | ψI | CH₃ | CH₃ | 5,7-CH₃O₂S | LII | H | — |
| D+ 81 | ΦI | CH₃ | CH₃ | 5,3-CH₃ | ψI | CH₃ | CH₃ | 5,3-CH₃ | LII | H | — |
| D+ 82 | ΦI | CH₃ | CH₃ | 5,7-CH₃CONH | ψI | CH₃ | CH₃ | 5,7-CH₃CONH | LII | H | — |
| D+ 83 | ΦI | CH₃ | CH₃ | 6-CH₃CONH | ψI | CH₃ | CH₃ | 6-CH₃CONH | LII | H | — |
| D+ 84 | ΦI | CH₃ | CH₃ | — | ψI | CH₃ | CH₃ | — | LII | H | — |
| D+ 85 | ΦI | CH₃ | CH₃ | — | ψI | CH₃ | CH₃ | — | LII | H | — |
| D+ 86 | ΦI | CH₃ | CH₃ | — | ψI | CH₃ | CH₃ | — | LII | H | — |
| D+ 87 | ΦI | CH₃ | CH₃ | — | ψI | CH₃ | CH₃ | — | LII | H | — |

Such cyanine dye cations are those known to the art as products of combination with such acid anions as $I^-$, $Br^-$, $ClO^-$, $BF_4^-$,

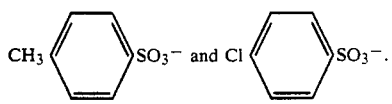

These combinations of cyanine dye cations with acid anions can be easily synthesized by following the methods disclosed in publications such as, for example, Great Organic Chemistry, Nitrogen-containing Heterocyclic Compounds I, page 432 (Asakura Shoten).

To be specific, a corresponding $\phi'$—$CH_3$ (wherein $\phi'$ denotes a ring corresponding to the aforementioned $\phi$) is heated in combination with an excess amount of $R_1I$ (wherein $R_1$ denotes an alkyl group or aryl group) to introduce $R_1$ to nitrogen atom in $\phi'$ to produce $\phi$—$CH-_3I^-$. Then, this product is subjected to dehydrogenation condensation with an unsaturated dialdehyde or unsaturated hydroxyaldehyde in the presence of an alkali catalyst.

Generally this cyanine dye cation assumes the form of a monomer. Optionally, it may be in the form of a polymer.

In this case, the polymer is formed of at least two molecules of cyanine dye cation. It may be a condensate of such cyanine dye cations.

For example, the polymer is a homopolycondensate or a copolycondensate of the aforementioned cyanine dye cation possessing one or more of at least one kind of functional group such as —OH, —COOH or —$SO_3H$, or a copolycondensate thereof with other copolycondensation component such as dialcohol, dicarboxylic aicd or a chloride thereof, diamine, di- or tri- isocyanate, di-epoxy compound, di-hydrazine or diiminocarbonate, or with other dye.

Otherwise, the polymer may be a product obtained by crosslinking a cyanine dye cation possessing the aforementioned functional group, either alone or in conjunction with other dye, by the use of a metallic cross-linking agent.

Examples of the metallic cross-linking agent used herein include alkoxides of titanium, zirconium and aluminum, chelates of titanium, zirconium, and aluminum (such as, for example, those having β-diketone, ketoesters, hydroxycarboxylic acids and esters thereof, ketoalcohols, aminoalcohols, and enolically active hydrogen compounds as ligand), and sialates of titanium, zirconium, and aluminum.

Further, at least one kind of cyanine dye cation possessing at least one group selected from the class consisting of —OH group, —OCOR group and —COOR group (wherein R denotes a substituted or unsubstituted alkyl group or aryl group) or a product obtained by transesterifying the cyanine dye cation with other spacer component or other dye and consequently having been bound with a —COO— group can also be used.

In this case, the transesterification is desired to be carried out by using as a catalyst therefor an alkoxide of titanium, zirconium, aluminum, etc.

Moreover, the aforementioned cyanine dye cation may be in a form bound with a resin.

In this case, the resin is required to possess a prescribed group. As in the case of the aforementioned polymer, the resin has the cyanine dye cation bound to the side chain thereof, when necessary through the medium of a spacer component, by means of condensation, transesterification or cross-linking.

As the quencher anion for the formation of the product of ionic bond, various quencher anions are available. Particularly the anions of transition metal chelate compounds prove advantageous because they resist deterioration by reading and exhibiting satisfactory compatibility with the dye bonding resin. In this case, the central metallic ion is desired to be ion of Ni, Co, Cu, Mn, Pd or Pt. The compounds enumerated below prove particularly desirable transition metal chelate compounds.

1) Compounds of the bisphenyldithiol type represented by the following formula:

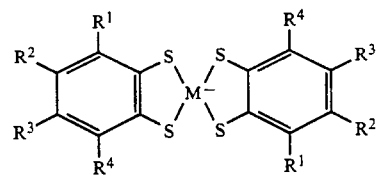

wherein $R^1$ through $R^4$ each denote a hydrogen atom, an alkyl group such as methyl group or ethyl group, a halogen atom such as Cl, or an amino group such as dimethylamino group or diethylamino gorup and M denotes a transition metal atom such as Ni, Co, Cu, Pd or Pt, preferably Ni.

Other ligands may be bound one each to the upper and lower positions of M.

Concrete examples of the type described above are as follows.

| | $R^1$ | $R^2$ | $R^3$ | $R^4$ | M |
|---|---|---|---|---|---|
| $Q^-$ 1-1 | H | H | H | H | Ni |
| $Q^-$ 1-2 | H | $CH_3$ | H | H | Ni |
| $Q^-$ 1-3 | H | H | Cl | H | Ni |
| $Q^-$ 1-4 | $CH_3$ | H | H | $CH_3$ | Ni |
| $Q^-$ 1-5 | $CH_3$ | $CH_3$ | $CH_3$ | $CH_3$ | Ni |
| $Q^-$ 1-6 | H | Cl | H | H | Ni |
| $Q^-$ 1-7 | Cl | Cl | Cl | Cl | Ni |
| $Q^-$ 1-8 | H | Cl | Cl | Cl | Ni |
| $Q^-$ 1-9 | Cl | H | H | H | Co |
| $Q^-$ 1-10 | H | $CH_3$ | $CH_3$ | H | Co |
| $Q^-$ 1-11 | H | $CH_3$ | $CH_3$ | H | Ni |
| $Q^-$ 1-12 | H | $N(CH_3)_2$ | H | H | Ni |
| $Q^-$ 1-13 | H | $N(CH_3)_2$ | $N(CH_3)_2$ | H | Ni |
| $Q^-$ 1-14 | H | $N(CH_3)_2$ | $CH_3$ | H | Ni |
| $Q^-$ 1-15 | H | $N(CH_3)_2$ | Cl | H | Ni |
| $Q^-$ 1-16 | H | $N(C_2H_5)_2$ | H | H | Ni |

2) Compounds of the bisdithio-α-diketone type represented by the following formula:

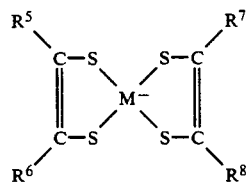

wherein $R^5$ through $R^8$ each denote a substituted or unsubstituted alkyl group or aryl group and M denotes a transition metal atom such as Ni, Co, Cu, Pd or Pt.

In the foregoing description, ph denotes a phenyl group, $\phi$ denotes a 1,4-phenylene group, $\phi'$ denotes a 1,2-phenylene group, and benz denotes the formation of a condensed benzene ring by the mutual bonding of two adjacent groups on a ring.

|      | R⁵       | R⁶ | R⁷      | R⁸ | M  |
|------|----------|----|---------|----|-----|
| Q⁻ 2-1 | φN(CH₃)₂ | ph | N(CH₃)₂ | ph | Ni |
| Q⁻ 2-2 | ph       | ph | ph      | ph | Ni |
| Q⁻ 2-3 | φN(C₂H₅)₂ | ph | N(C₂H₅)₂ | ph | Ni |

Compounds represented by the following formula:

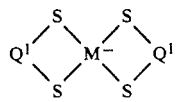

wherein M denotes a transition metal atom and $Q^1$ denotes

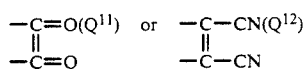

|      | M  | Q    |
|------|----|------|
| Q⁻ 3-1 | Ni | Q¹² |
| Q⁻ 3-2 | Ni | Q¹² |
| Q⁻ 3-3 | Co | Q¹² |
| Q⁻ 3-4 | Cu | Q¹² |
| Q⁻ 3-5 | Pd | Q¹² |

4) Compounds represented by the following formula:

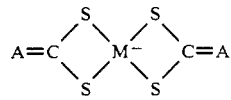

wherein M denotes a transition metal atom, A denotes S,

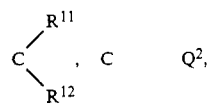

$R^{11}$ and $R^{12}$ each denote CN, $COR^{13}$, $COOR^{14}$, $CONR^{15}$ or substituted or unsubstituted alkyl group or aryl group, $Q^2$ denotes an atomic group necessary for the formation of a five-member or six-member ring.

|      | M  | A |
|------|----|---|
| Q⁻ 4-1 | Ni | S |
| Q⁻ 4-2 | Ni | S |
| Q⁻ 4-3 | Ni | C(CN)(CN) |
| Q⁻ 4-4 | Ni | C(CN)₂ |
| Q⁻ 4-5 | Ni | C(CN)₂ |
| Q⁻ 4-6 | Ni | C(CONH₂)(CN) |

5) Compounds represented by the following formula:

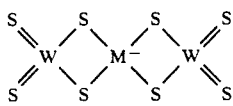

wherein M denotes a transition metal atom.

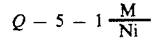

The compounds disclosed in Japanese Patent Application SHO 58-127,075 are other concrete examples.

6) Compounds of the thiocatechol chelate type represented by the following formula:

wherein M denotes a transition metal atom such as Ni, Co, Cu, Pd or Pt. Optionally, the benzene ring may possess a substituent.

7) Compounds represented by the following formula:

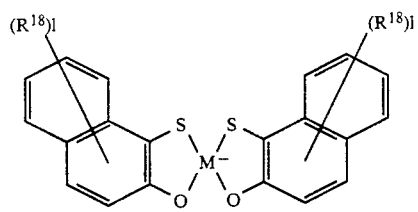

wherein $R^{18}$ denotes a monovalent group, "l" denotes an integer of the value of 0 to 6, and M denotes a transition metal atom.

|      | M  | R¹⁸ | l |
|------|----|-----|---|
| Q⁻ 7-1 | Ni | H   | 0 |
| Q⁻ 7-2 | Ni | CH₃ | 1 |

8) Compounds of the thiobisphenolate chelate type represented by the following formula:

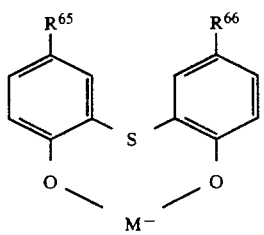

wherein M has the same meaning as defined above and $R^{65}$ and $R^{66}$ each denote an alkyl group.

|     | R⁶⁵  R⁶⁶ | M  |
| --- | --- | --- |
| Q⁻ 8-1 | +—C₈H₁₇ | Ni |
| Q⁻ 8-2 | +—C₈H₁₇ | Co |

In all the quencher anions enumerated above, those of the phenylbisdithiol type given in 1) above prove to be most desirable. This is because they suffer from deterioration by reading light to a decisively smaller extent and exhibit extremely high resistance to light.

Now, concrete examples of the photostable cyanine dyes of this invention will be cited below.

|     | D⁺ | Q⁻ |
| --- | --- | --- |
| D 1 | D⁺ 1 | Q⁻ 1-8 |
| D 2 | D⁺ 2 | Q⁻ 1-8 |
| D 3 | D⁺ 3 | Q⁻ 1-8 |
| D 4 | D⁺ 4 | Q⁻ 1-8 |
| D 5 | D⁺ 5 | Q⁻ 1-8 |
| D 6 | D⁺ 3 | Q⁻ 1-12 |
| D 7 | D⁺ 1 | Q⁻ 1-14 |
| D 8 | D⁺ 2 | Q⁻ 1-7 |
| D 9 | D⁺ 6 | Q⁻ 1-8 |
| D 10 | D⁺ 7 | Q⁻ 1-12 |
| D 11 | D⁺ 8 | Q⁻ 1-8 |
| D 12 | D⁺ 10 | Q⁻ 1-8 |
| D 13 | D⁺ 11 | Q⁻ 1-8 |
| D 14 | D⁺ 12 | Q⁻ 1-12 |
| D 15 | D⁺ 13 | Q⁻ 1-12 |
| D 16 | D⁺ 14 | Q⁻ 1-8 |
| D 17 | D⁺ 14 | Q⁻ 1-12 |
| D 18 | D⁺ 14 | Q⁻ 1-7 |
| D 19 | D⁺ 15 | Q⁻ 1-8 |
| D 20 | D⁺ 16 | Q⁻ 1-2 |
| D 21 | D⁺ 17 | Q⁻ 1-14 |
| D 22 | D⁺ 18 | Q⁻ 1-13 |
| D 23 | D⁺ 19 | Q⁻ 1-7 |
| D 24 | D⁺ 20 | Q⁻ 1-3 |
| D 25 | D⁺ 21 | Q⁻ 1-8 |
| D 26 | D⁺ 22 | Q⁻ 1-12 |
| D 27 | D⁺ 23 | Q⁻ 1-2 |
| D 28 | D⁺ 24 | Q⁻ 1-14 |
| D 29 | D⁺ 25 | Q⁻ 1-14 |
| D 30 | D⁺ 26 | Q⁻ 1-12 |
| D 31 | D⁺ 27 | Q⁻ 1-12 |
| D 32 | D⁺ 28 | Q⁻ 1-3 |
| D 33 | D⁺ 29 | Q⁻ 1-7 |
| D 34 | D⁺ 5 | Q⁻ 1-7 |
| D 35 | D⁺ 31 | Q⁻ 1-7 |
| D 36 | D⁻ 32 | Q⁻ 1-2 |
| D 37 | D⁺ 33 | Q⁻ 1-14 |
| D 38 | D⁺ 34 | Q⁻ 1-7 |
| D 39 | D⁺ 35 | Q⁻ 1-8 |
| D 40 | D⁺ 36 | Q⁻ 1-3 |
| D 41 | D⁺ 37 | Q⁻ 1-13 |
| D 42 | D⁺ 38 | Q⁻ 1-14 |
| D 43 | D⁺ 39 | Q⁻ 1-2 |
| D 44 | D⁺ 40 | Q⁻ 1-7 |
| D 45 | D⁺ 41 | Q⁻ 1-2 |
| D 46 | D⁺ 42 | Q⁻ 1-3 |
| D 47 | D⁺ 43 | Q⁻ 1-8 |
| D 48 | D⁺ 44 | Q⁻ 1-8 |
| D 49 | D⁺ 45 | Q⁻ 1-8 |
| D 50 | D⁺ 46 | Q⁻ 1-12 |
| D 51 | D⁺ 47 | Q⁻ 1-8 |
| D 52 | D⁺ 48 | Q⁻ 1-2 |
| D 53 | D⁺ 49 | Q⁻ 1-14 |
| D 54 | D⁺ 50 | Q⁻ 1-7 |
| D 55 | D⁺ 51 | Q⁻ 1-3 |
| D 56 | D⁺ 52 | Q⁻ 1-12 |
| D 57 | D⁺ 3 | Q⁻ 2-1 |
| D 58 | D⁺ 6 | Q⁻ 1-3 |
| D 59 | D⁺ 9 | Q⁻ 3-1 |
| D 60 | D⁺ 14 | Q⁻ 4-1 |
| D 61 | D⁺ 15 | Q⁻ 5-2 |
| D 62 | D⁺ 17 | Q⁻ 7-1 |
| D 63 | D⁺ 18 | Q⁻ 6-1 |
| D 64 | D⁺ 20 | Q⁻ 8-1 |

-continued

|     |     |     | Quantative analysis of Ni | |
| --- | --- | --- | --- | --- |
|     | D⁺ | Q⁻ | Found | Calculated |
| D 65 | D⁺ 53 | Q⁻ 1-8 | 6.07 | 6.15 |
| D 66 | D⁺ 53 | Q⁻ 1-12 | 6.93 | 7.04 |
| D 67 | D⁺ 54 | Q⁻ 1-12 | 4.77 | 4.85 |
| D 68 | D⁺ 53 | Q⁻ 1-3 | 6.51 | 6.63 |
| D 69 | D⁺ 55 | Q⁻ 1-8 | 6.20 | 5.56 |
| D 70 | D⁺ 55 | Q⁻ 1-12 | 6.41 | 6.28 |
| D 71 | D⁺ 56 | Q⁻ 1-8 | 4.10 | 4.69 |
| D 72 | D⁺ 57 | Q⁻ 1-8 | 4.22 | 3.83 |
| D 73 | D⁺ 58 | Q⁻ 1-8 | 4.55 | 4.70 |
| D 74 | D⁺ 59 | Q⁻ 1-8 | 4.97 | 4.90 |
| D 75 | D⁺ 59 | Q⁻ 1-2 | 5.88 | 5.75 |
| D 76 | D⁺ 60 | Q⁻ 1-12 | 4.75 | 4.62 |
| D 77 | D⁺ 61 | Q⁻ 1-12 | 5.48 | 5.57 |
| D 78 | D⁺ 62 | Q⁻ 1-12 | 6.51 | 6.64 |
| D 79 | D⁺ 63 | Q⁻ 1-12 | 6.32 | 6.28 |
| D 80 | D⁺ 55 | Q⁻ 1-7 | 5.35 | 5.22 |
| D 81 | D⁺ 64 | Q⁻ 1-2 | 5.51 | 5.47 |
| D 82 | D⁺ 65 | Q⁻ 1-14 | 6.45 | 6.37 |
| D 83 | D⁺ 66 | Q⁻ 1-7 | 5.11 | 4.96 |
| D 84 | D⁺ 67 | Q⁻ 1-3 | 4.89 | 4.65 |
| D 85 | D⁺ 68 | Q⁻ 1-13 | 5.61 | 5.52 |
| D 86 | D⁺ 69 | Q⁻ 1-8 | 6.44 | 6.32 |
| D 87 | D⁺ 69 | Q⁻ 1-12 | 7.31 | 7.26 |
| D 88 | D⁺ 70 | Q⁻ 1-8 | 5.66 | 5.70 |
| D 89 | D⁺ 70 | Q⁻ 1-12 | 6.55 | 6.46 |
| D 90 | D⁺ 53 | Q⁻ 1-7 | 5.71 | 5.73 |
| D 91 | D⁺ 53 | Q⁻ 1-2 | 7.44 | 7.56 |
| D 92 | D⁺ 53 | Q⁻ 1-13 | 6.31 | 6.38 |
| D 93 | D⁺ 53 | Q⁻ 1-14 | 6.90 | 6.81 |
| D 94 | D⁺ 71 | Q⁻ 1-8 | 5.07 | 5.11 |
| D 95 | D⁺ 72 | Q⁻ 1-8 | 5.35 | 5.47 |
| D 96 | D⁺ 72 | Q⁻ 1-12 | 6.22 | 6.16 |
| D 97 | D⁺ 73 | Q⁻ 1-8 | 5.81 | 5.93 |
| D 99 | D⁺ 73 | Q⁻ 1-12 | 6.82 | 6.75 |
| D 100 | D⁺ 73 | Q⁻ 1-7 | 5.49 | 5.54 |
| D 101 | D⁺ 71 | Q⁻ 1-12 | 5.75 | 5.72 |
| D 102 | D⁺ 55 | Q⁻ 1-7 | 5.11 | 5.22 |
| D 103 | D⁺ 61 | Q⁻ 1-8 | 5.09 | 5.00 |
| D 104 | D⁺ 61 | Q⁻ 1-7 | 4.62 | 4.72 |
| D 105 | D⁺ 61 | Q⁻ 1-2 | 5.68 | 5.90 |
| D 106 | D⁺ 61 | Q⁻ 1-13 | 5.01 | 5.15 |
| D 107 | D⁺ 74 | Q⁻ 1-8 | 5.46 | 5.39 |
| D 108 | D⁺ 74 | Q⁻ 1-12 | 6.18 | 6.06 |
| D 109 | D⁺ 63 | Q⁻ 1-8 | 5.51 | 5.56 |
| D 110 | D⁺ 63 | Q⁻ 1-2 | 6.48 | 6.70 |
| D 111 | D⁺ 63 | Q⁻ 1-7 | 5.09 | 5.22 |
| D 112 | D⁺ 63 | Q⁻ 1-13 | 5.63 | 5.75 |
| D 113 | D⁺ 75 | Q⁻ 1-8 | 5.78 | 5.84 |
| D 114 | D⁺ 76 | Q⁻ 1-2 | 5.79 | 5.76 |
| D 115 | D⁺ 54 | Q⁻ 1-12 |     |     |
| D 116 | D⁺ 78 | Q⁻ 1-8 |     |     |
| D 117 | D⁺ 82 | Q⁻ 1-8 |     |     |
| D 118 | D⁺ 78 | Q⁻ 1-12 |     |     |
| D 119 | D⁺ 78 | Q⁻ 1-3 |     |     |
| D 120 | D⁺ 78 | Q⁻ 1-7 |     |     |
| D 121 | D⁺ 89 | Q⁻ 1-8 |     |     |
| D 122 | D⁺ 89 | Q⁻ 1-12 |     |     |
| D 123 | D⁺ 37 | Q⁻ 1-8 |     |     |
| D 124 | D⁺ 54 | Q⁻ 1-8 |     |     |

Such a photostable cyanine dye of this invention is produced as follows.

First, a cationic cyanine dye having an anion bound thereto is prepared.

In this case, the anion (An⁻) can be any one member selected from among I⁻, Br⁻, ClO₄,

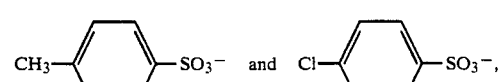

for example.

Thus, the cyanine dye is a known substance and can be synthesized by the ordinary method. For example, the method described in Great Organic Chemistry (Asakura shoten), Nitrogen-containing Heterocyclic Compounds I, page 432, may be adopted with necessary modifications.

Separately, an anionic quencher having a cation bound thereto is prepared. In this case, the cation (Cat+) is preferred to be a tetraalkyl ammonium such as $N^+(CH_3)_4$ or $N^+(C_4H_9)_4$, for example.

This quencher can be synthesized by following the disclosure of Japanese Patent Application Laid-open SHO 57(1982)-166,832 or Japanese Patent Applicaton SHO 58(1983)-163,080.

Then, the cyanine dye and the quencher described above are dissolved in equal mols in a polar organic solvent. The polar organic solvent to be used in this solution is desired to be N,N-dimethyl formamide, for example.

The concentrations of the solutes are desired to be about 0.001 to 0.5 mol/liter, preferably about 0.01 mol/liter.

Subsequently, the resultant solution is mixed with an aqueous solvent, preferably water, to induce double decomposition and subsequent precipitation. The amount of water so added is desired to be a large excess of at least 10 times the amount of the solution.

The reaction temperature is desired to fall in the range of 20° to 90° C.

EXAMPLE 1

Synthesis of D1

In 20 ml of dimethylformamide (DMF), 0.135 g (0.00025 mol) of 1.1'-diethyldithiatricarbocyanine-perchlorate (perchlorate of DTTC-14306 D+ 1 made by E. Kodak) and 0.197 g (0.00025 mol) of bis(3,4,6-trichloro-1,2-dithiophenolate)-nickel(II) tetra-n-butyl ammonium (tetrabutyl ammonium salt of PA-1006 Q−1-8 made by Mitsui-Toatsu Chemical) were dissolved and left reacting at 70° C. for three hours.

After the reaction, the resultant reaction solution was poured into cold water to induce precipitation. The precipitate so formed was separated by filtration, washed with water, and dried under a vacuum.

Amount of product-0.22 g (yield 92%)

This product was dissolved with heat in 10 ml of DMF and left standing in 30 ml of hot ethanol added thereto to induce recrystallization. Consequently D1 was obtained.

M.P. 182° C. (blackish green)

The dye was subjected to quantitative analysis for Ni content by the atomic absorption method. The results were as follows.

| Ni content (in wt %) | Calculated: | 6.1 |
| --- | --- | --- |
|  | Found: | 5.9 |
| Calculated for 1:1 mixture of pigment and stabilizer: |  | 4.5 |

EXAMPLE 2

Synthesis of D1

A photostable dye D1 was obtained by following the procedure of 1 using iodide of D+1 and tetrabutyl ammonium salt of Q− 1-8.

| Yield: | 90% |
| --- | --- |
| M.P.: | 182° C. (blackish green) |
| Ni content (in wt %) | Calculated: 6.10 |
|  | Found: 5.90 |

EXAMPLE 3

Synthesis of D14

In 20 ml of DMF, 0.130 g (0.00025 mol) of 1.1'-diethyltri-carbocyanine iodide (iodide of D+12, product of Nippon Kankoshikiso Kenkyusho and marketed under trademark designation of NK-123) and 0.167 g (0.00025 mol) of bis(4-dimethylamino-1,2-dithiophenolate)-nickel(II) tetra-n-butyl ammonium (tetrabutyl ammonium of Q−1-12, product of Teikoku Kagaku Sangyo and marketed under trademark designation of NIR-C-2) were dissolved and subjected to double decomposition by following the procedure of Example 1, to afford D14.

| Amount of product: | 0.21 g (yield 100%) |  |
| --- | --- | --- |
| M.P. | 175° C. to 176° C. (reddish brown) |  |
| Ni content (in wt %): | Calculated: | 7.1 |
|  | Found: | 7.0 |
| Calculated for mixture: |  | 5.0 |

EXAMPLE 4

Synthesis of D2

A photostable dye D2 was obtained by following the procedure of Example 1, using perchlorate of D+ 2 (IR-140 made by E. Kodak) and tetrabutyl ammonium salt of Q−1-8.

| Yield: | 95% |  |
| --- | --- | --- |
| M.P.: | 183° to 184° C. (Dark green) |  |
| Ni content (in wt %): | Calculated: | 4.79 |
|  | Found: | 4.83 |

EXAMPLE 5

Synthesis of D3

A photostable dye D3 was obtained by following the procedure of Example 1, using perchlorate of D+ 3 (NK-2860 produced by Nippon Kankoshikiso Kenkyusho) and tetrabutyl ammonium salt of Q−1-8.

| Yield: | 93% |  |
| --- | --- | --- |
| M.P.: | 134° to 135° C. (dark green) |  |
| Ni content (in wt %): | Calculated: | 5.19 |
|  | Found: | 4.78 |

EXAMPLE 6

Synthesis of D4

A photostable dye D4 was obtained by following the procedure of Example 1, using perchlorate of D+4 (NK-2862 made by Nippon Kankoshikiso Kenkyusho) and tetrabutyl ammonium salt of Q− 1-8.

| Yield: | 93% |  |
| --- | --- | --- |
| M.P.: | 124° to 127° C. (reddish purple) |  |
| Ni content (in wt %): | Calculated: | 4.89 |

EXAMPLE 7

Synthesis of D5

A photostable dye D5 was obtained by following the procedure of Example 1, using perchlorate of D+ 5 (NK-2871 produced by Nippon Kankoshikiso Kenkyusho) and tetrabutyl ammonium salt of Q− 1-8.

| Yield: | 94% | |
|---|---|---|
| M.P.: | 167° to 168° C. (reddish purple) | |
| Ni content (in wt %): | Calculated: | 4.21 |
| | Found: | 4.16 |

EXAMPLE 8

Synthesis of D6

A photostable dye D6 was obtained by following the procedure of Example 1, using perchlorate of D+3 (NK-2860 produced by Nippon Kankoshikiso Kenkyusho) and tetrabutyl ammonium salt of Q− 12 (NIR C-2 produced by Teikoku Kagaku Sangyo).

| Yield: | 96% | |
|---|---|---|
| M.P.: | 109° to 111° C. (dark reddish purple) | |
| Ni content (in wt %): | Calculated: | 5.81 |
| | Found: | 5.66 |

EXAMPLE 9

Synthesis of D7

A photostable dye D7 was obtained by following the procedure of Example 1, using iodide of D+ 1 and tetrabutyl ammonium salt of Q− 1-14 (NIR C-3 produced by Teikoku Kagaku Sangyo).

| Yield: | 97% | |
|---|---|---|
| M.P.: | 173° C. (Grayish black green) | |
| Ni content (in wt %): | Calculated: | 6.75 |
| | Found: | 6.47 |

EXAMPLE 10

Synthesis of D8

A photostable dye D8 was obtained by following the procedure of example 1, using perchlorate of D+ 2 (IR-140 produced by E. Kodak) and tetrabutyl ammonium salt of Q− -1-7 (PA-1003 produced by Mitsui Toatsu Chemical).

| Yield: | 68% | |
|---|---|---|
| M.P.: | 185° C. (Blackish green) | |
| Ni content (in wt %): | Calculated: | 4.54 |
| | Found: | 4.59 |

EXAMPLE 11

Synthesis of D9

A photostable dye D9 was obtained by following the procedure of Example 1, using toleuensulfonate of D+ 6 (NK-2868 produced by Nippon Kankoshikiso Kenkyusho) and tetrabutyl ammonium salt of Q− 1-8.

| Yield: | 76% | |
|---|---|---|
| M.P.: | 138° to 140° C. (Blackish green) | |
| Ni content (in wt %): | Calculated: | 4.77 |
| | Found: | 4.56 |

EXAMPLE 12

Synthesis of D10

A photostable dye D10 was obtained by following the procedure of Example 1, using perchlorate of D+ 7 (NK-2870 produced by Nippon Kankoshikiso Kenkyusho) and tetrabutyl ammonium salt of Q− 1-12.

| Yield: | 95% | |
|---|---|---|
| M.P.: | 200° to 210° C. (dark green) | |
| Ni content (in wt %): | Calculated: | 4.50 |
| | Found: | 4.31 |

EXAMPLE 13

Synthesis of D11

A photostable dye D11 was obtained by following the procedure of Example 1 using iodide of D+ 8 (cryptocyanine) and tetrabutyl ammonium salt of Q− 1-8.

| Yield: | 98% | |
|---|---|---|
| M.P.: | 114° to 115° C. | |
| Ni content (in wt %): | Calculated: | 6.53 |
| | Found: | 6.74 |

EXAMPLE 14

Synthesis of D12

A photostable dye D12 was obtained by following the procedure of Example 1, using perchlorate of D+ 10 (NK-78 produced by Nippon Kankoshikiso Kenkyusho) and tetrabutyl ammonium salt of Q− 1-8.

| Yield: | 93% | |
|---|---|---|
| M.P.: | Gradually decomposed (grayish green) | |
| Ni content (in wt %): | Calculated: | 6.11 |
| | Found: | 6.07 |

EXAMPLE 15

Synthesis of D16

A photostable dye D16 was obtained by following the procedure of Example 1, using perchlorate of D+ 14 (NK-2934 produced by Nippon kankoshikiso Kenkyusho) and tetrabutyl ammonium salt of Q− 1-8.

| Yield: | 94% | |
|---|---|---|
| M.P.: | 171° C. (Reddish purple) | |
| Ni content (in wt %): | Calculated: | 5.50 |
| | Found: | 5.51 |

EXAMPLE 16

Synthesis of D18

A photostable dye D18 was obtained by following the procedure of Example 1, using perchlorate of D+

14 (NK-2934 produced by Nippon Kankoshikiso Kenkyusho) and tetrabutyl ammonium salt of Q⁻ 1-7.

| Yield: | 96% | |
|---|---|---|
| M.P.: | 171° C. (Dark reddish purple) | |
| Ni content (in wt %): | Calculated: | 5.17 |
| | Found: | 5.21 |

EXAMPLE 17

Synthesis of D19

A photostable dye D19 was obtained by following the procedure of Example 1, using perchlorate of D⁺ 15 (NK-2930 produced by Nippon Kankoshikiso Kenkyusho) and tetrabutyl ammonium salt of Q⁻ 1-8.

| Yield: | 100% | |
|---|---|---|
| M.P.: | 208° to 211° C. (Blackish green) | |
| Ni content (in wt %): | Calculated: | 4.58 |
| | Found: | 4.71 |

EXAMPLE 18

Synthesis of D65

In 20 ml of N,N'-dimethylformamide, 0.25 g (0.0005 mol) of 1,3,3,1',3',3'-hexamethylindotricarbocyanine iodide (iodide of D+53, NK-125 produced by Nippon Kankoshikiso Kenkyusho) and 0.39 g (0.0005 mol) of bis(3,4,6-trichloro-1,2-dithiophenolate)-nickel(II)tetra-n-butyl ammonium (tetrabutyl ammonium salt of Q⁻1 1-8, PA-1006 produced by Mitsui Toatsu Chemical) were dissolved and left standing at 70° C. for three hours. The resultant reaction solution was poured into cold water. The precipitate consequently formed therein was separated by filtration, washed with water, and dried under a vacuum, to afford 1,3,3,1',3',3'-hexamethyliodotricarbocyaninebis(3,4,6-trichloro-1,2-dithioph enolate)-nickel(II), D65.

Amount of product: 0.40 g (yield 88%)

The product was dissolved with heat in 10 ml of DMF, left standing in 30 ml of hot ethanol added thereto, and recrystallized.

M.P.: 181° to 182° C. (reddish brown)

The product was subjected to quantitative analysis for Ni content by the atomic absorption method. The results were as shown below.

| Ni content (in wt %) | Calculated: | 6.15 |
|---|---|---|
| | Found: | 6.07 |
| Calculated for 1:1 Mixture of dye and stabilizer: | | 4.43 |

EXAMPLE 19

Synthesis of D69

A photostable dye D69 was obtained by subjecting 0.153 g (0.00025 mol) of 1,3,3,1',3'3'-hexamethyl-4,5,4',5'-dibenzoindotricarbocyanineperchlorate (perchlorate of D⁺ 55, HDITC-15073 produced by E. Kodak) and 0.197 g (0.00025 mol) of PA-1006 (tetrabutyl ammonium salt of Q⁻ 1-8) to double decomposition after the procedure of Example 1.

Amount of product: 0.23 g (yield 87%)
The product was recrystallized from DMF-ethanol.

| M.P.: | 177° to 179° C. (grayish green) | |
|---|---|---|
| Ni content (in wt %): | Calculated: | 5.56 |
| | Found: | 6.20 |
| Calculated for mixture: | | 4.2 |

EXAMPLE 20

Synthesis of D66

A photostable dye D66 was obtained by following the procedure of Example 19, using iodide of D⁺ 53 (NK-125 produced by Nippon Kankoshikiso Kenkyusho) and tetrabutyl ammonium salt of Q⁻ 1-12 (NIR C-2 produced by Teikoku Kagaku Sangyo).

| Yield: | 91% | |
|---|---|---|
| M.P.: | Gradually decomposed (black) | |
| Ni content (in wt %): | Calculated: | 7.04 |
| | Found: | 6.93 |

EXAMPLE 21

Synthesis of D67

A photostable dye D67 was obtained by following the procedure of Example 19, using perchlorate of D⁺ 54 (NK-2905 produced by Nippon Kankoshikiso Kenkyusho) and tetrabutyl ammonium salt of Q⁻ 1-12 (NIR C-2 produced by Teikoku Kagaku Sangyo).

| Yield: | 80% | |
|---|---|---|
| M.P.: | 240° C. (decomposed) (blackish green) | |
| Ni content (in wt %): | Calculated: | 4.85 |
| | Found: | 4.77 |

EXAMPLE 22

Synthesis of D68

A photostable dye D68 was obtained by following the procedure of Example 19, using perchlorate of D⁺ 53 (NK-125 produced by Nippon Kankoshikiso Kenkyusho) and ammonium salt of Q⁻ 1-3 (PA-1005 produced by Mitsui Toatsu Chemical).

| Yield: | 95% | |
|---|---|---|
| M.P.: | 219° to 220° C. (Green) | |
| Ni content (in wt %): | Calculated: | 6.63 |
| | Found: | 6.51 |

EXAMPLE 23

Synthesis of D70

A photostable dye D70 was obtained by following the procedure of Example 19, using perchlorate of D⁺ 55 (15073 produced by E. Kodak) and tetrabutyl ammonium salt of Q⁻ 1-12.

| Yield: | 89% | |
|---|---|---|
| M.P.: | 210° to 212° C. (Dark green) | |
| Ni content (in wt %): | Calculated: | 6.28 |
| | Found: | 2.41 |

EXAMPLE 24

Synthesis of D71

A photostable dye D71 was obtained by following the procedure of Example 19, using perchlorate of D+ 56 (NK-2865 produced by Nippon Kankoshikiso Kenkyusho) and tetrabutyl ammonium salt of Q− 1-8.

| Yield: | 75% | |
|---|---|---|
| M.P.: | 137° to 140° C. (Blackish green) | |
| Ni content (in wt %): | Calculated: | 4.69 |
| | Found: | 4.10 |

EXAMPLE 25

Synthesis of D72

A photostable dye D72 was obtained by following the procedure of Example 19, using perchlorate of D+ 57 (NK-2866 produced by Nippon Kankoshikiso Kenkyusho) and tetrabutyl ammonium salt of Q− 1-8.

| Yield: | 88% | |
|---|---|---|
| M.P.: | 73° to 75° C. (Blackish green) | |
| Ni content (in wt %): | Calculated: | 3.83 |
| | Found: | 4.22 |

EXAMPLE 26

Synthesis of D73

A photostable dye D73 was obtained by following the procedure of Example 19, using perchlorate of D+ 58 (NK-2873 produced by Nippon Kankoshikiso Kenkyusho) and tetrabutyl ammonium salt of Q− 1-8.

| Yield: | 100% | |
|---|---|---|
| M.P.: | 217° to 218° C. (Reddish purple) | |
| Ni content (in wt %): | Calculated: | 4.70 |
| | Found: | 4.55 |

EXAMPLE 27

Synthesis of D74

A photostable dye D74 was obtained by following the procedure of Example 19, using bromide of D+ 59 (NK-2902 produced by Nippon Kankoshikiso Kenkyusho) and tetrabutyl ammonium salt of Q− 1-8.

| Yield: | 92% | |
|---|---|---|
| M.P.: | Gradually decomposed (dark green) | |
| Ni content (in wt %): | Calculated: | 4.90 |
| | Found: | 4.97 |

EXAMPLE 28

Synthesis of D75

A photostable dye D75 was obtained by following the procedure of Example 19, using bromide of D+ 59 (NK-2902 produced by Nippon Kankoshikiso Kenkyusho) and tetrabutyl ammonium salt of Q− 1-2.

| Yield: | 97% | |
|---|---|---|
| M.P.: | 183° to 184° C. (Blackish green) | |
| Ni content (in wt %): | Calculated: | 5.75 |
| | Found: | 5.88 |

EXAMPLE 29

Synthesis of D76

A photostable dye D76 was obtained by following the procedure of Example 19, using perchlorate of D+ 60 (NK-2910 produced by Nippon Kankoshikiso Kenkyusho) and tetrabutyl ammonium salt of Q− 1-12.

| Yield: | 81% | |
|---|---|---|
| M.P.: | 193° to 194° C. (Dark green) | |
| Ni content (in wt %): | Calculated: | 4.62 |
| | Found: | 4.75 |

EXAMPLE 30

Synthesis of D77

A photostable dye D77 was obtained by following the procedure of Example 19, using perchlorate of D+ 61 (NK-2921 produced by Nippon Kankoshikiso Kenkyusho) and tetrabutyl ammonium salt of Q− 1-12.

| Yield: | 88% | |
|---|---|---|
| M.P.: | 140° C. (Black green) | |
| Ni content (in wt %): | Calculated: | 5.57 |
| | Found: | 5.48 |

EXAMPLE 31

Synthesis of D79

A photostable dye D79 was obtained by following the procedure of Example 19, using perchlorate of D+ 63 (NK-2880 produced by Nippon Kankoshikiso Kenkyusho) and tetrabutyl ammonium salt of Q− 1-12.

| Yield: | 96% | |
|---|---|---|
| M.P.: | 209° C. (Brilliant orange) | |
| Ni content (in wt %): | Calculated: | 6.28 |
| | Found: | 6.32 |

EXAMPLE 32

Synthesis of D80

A photostable dye D80 was obtained by following the procedure of Example 19, using perchlorate of D+ 55 (HDITC-15073 produced by E. Kodak) and tetrabutyl ammonium salt of Q− 1-7.

| Yield: | 71% | |
|---|---|---|
| M.P.: | 200° to 201° C. (Green) | |
| Ni content (in wt %): | Calculated: | 5.22 |
| | Found: | 5.35 |

EXAMPLE 33

Synthesis of D116

A photostable dye D116 was obtained by following the procedure of Example 1, using 1,1′,3,3,3′,3′-hexamethyl-5,5′-dichloroindolinotricarbocyanine iodide (iodide of D+ 78) obtained by a method of Harald and Zinck and tetrabutyl ammonium salt of Q− 1-8.

| | |
|---|---|
| Yield: | 75% |
| M.P.: | 205° to 208° C. |
| Ni content (in wt %): Calculated: | 5.73 |
| Found: | 5.81 |

EXAMPLE 34

Synthesis of D123

A photostable dye D123 was obtained by following the procedure of Example 1, using perchlorate 1,3,3,1',3',3'-hexamethyl-5,5'-diethyloxycarbonylindolinotric arbocyanine p-toluene sulfonate (p-toluene sulfonate of D+ 89) obtained by a similar method to the above and tetrabutyl ammonium salt of Q− 1-8.

| | |
|---|---|
| Yield: | 70% |
| M.P.: | 192° to 194° C. |
| Ni content (in wt %): Calculated: | 5.34 |
| Found: | 5.49 |

EXAMPLE 35

Synthesis of D124

A photostable dye D124 was obtained by following the procedure of Example 1, using perchlorate of D+ 54 obtained by a similar method to Example 16 and tetrabutyl ammonium salt of Q− 1-8.

| | |
|---|---|
| Yield: | 82% |
| M.P.: | 234° to 236° C. |
| Ni content (in wt %): Calculated: | 5.28 |
| Found: | 5.25 |

The values of $\lambda_{max}$ of the absorption spectra of the photostable dyes in dichloroethane were substantially the same as those of the cyanine dyes used as the raw materials.

The various compounds mentioned above were synthesized as described above.

The compounds were subjected to quantitative analysis for their Ni contents. The values thus found have been indicated above as compared with the calculated values in the respective examples.

The photostable cyanine dyes of the present invention possess extremely high resistance to light because they have prescribed quencher anions bonded thereto. Since the dye cation and the quencher anion are joined by ionic bond, the photostable dye enjoys much higher resistance to light than the mere mixture of the cation and the anion.

Since the photostable cyanine dye of this invention contains no other anion or cation therein, it is free from the adverse effects otherwise caused by such extraneous ions.

Thus, the photostable cyanine dye of this invention proves highly useful as sensitive dyes for use in optical recording media, dye lasers and electrophotographic materials.

The photostable cyanine dye formed of an ionic bond composition as described above can be combined with other dye within the range not detrimental to the effect aimed at by this invention, to produce a recording layer.

Further, the recording layer may incorporate resin therein.

In this case, an autoxidizable resin, decomposable resin, or thermoplastic resin is advantageously used.

Concrete examples of the resin usable particularly advantageously herein are as follows.

i) Polyolefins

Polyethylene, polypropylene and poly-4-methylpentene-1.

ii) Polyolefin copolymers

Ethylene-vinyl acetate copolymer, ethylene-acrylate copolymers, ethylene-acrylic acid coppolymer, ethylene-propylene copolymer, ethylene-butene-1 copolymer, ethylene-maleic anhydride copolymer, and ethylene-propylene terpolymer (EPT).

The polymerizing ratios of comomoners in such copolymers are optional.

iii) Vinyl chloride copolymers

Vinyl acetate-vinyl chloride copolymer, vinyl chloride-vinylidene chloride copolymer, vinyl chloride-maleic anhydride copolymer, copolymers of acrylic esters or methacrylic esters with vinyl chloride, acrylonitrile-vinyl chloride copolymer, vinyl chloride-vinyl ether copolymer, ethylene- or propylene-vinyl chloride copolymer and ethylenevinyl acetate copolymer having vinyl chloride graft polymerized thereto.

In this case, the polymerizing ratios of comonomers in such copolymers are optional.

iv) Vinylidene chloride copolymers

Vinylidene chloride-vinyl chloride copolymer, vinylidene chloride-vinyl chloride-acrylonitrile copolymer and vinylidene chloride-butadiene-vinyl halide copolymer.

In this case, the polymerizing ratios of comonomers in such copolymers are optional.

v) Polystyrene vi) Styrene copolymers

Styrene-acrylonitrile copolymer (AS resin), styrene-acrylonitrile-butadiene copolymer (ABS resin), styrene-maleic anhydride copolymer (SMA resin), styrene-acrylic ester-acrylamide copolymers, styrene-butadiene copolymer (SBR), styrene-vinylidene chloride copolymer and styrene-methyl methacrylate copolymer.

In this case, the polymerizing ratios comonomers in such copolymers are optional.

vii) Styrenic polymers

α-Methylstyrene, p-methylstyrene, 2,5-dichlorostyrene, α, β-vinyl naphthalene, α-vinyl pyridine, acenaphthene and vinyl anthracene, and copolymers thereof such as, for example, copolymer of α-methylstyrene with methacrylic ester.

viii) Cumarone-indene resin

Cumarone-indene-styrene copolymer.

ix) Terpene resin or picolite

Terpene resin which is the polymer of limonene derived from α-pinene and picolite derived from β-pinene.

x) Acrylic resin

Particularly acrylic resin of the type containing an atomic group represented by the following formula proves desirable.

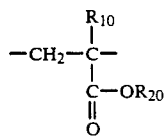

Formula $$-CH_2-\underset{\underset{O}{\overset{\|}{C}}-OR_{20}}{\overset{R_{10}}{\underset{|}{C}}}-$$

In the formula given above, $R_{10}$ stands for hydrogen atom or an alkyl group having 1 to 4 carbon aotms and $R_{20}$ for a substituted or unsubstitued alkyl group having 1 to 8 carbon atoms in the alkyl moiety. In this case, $R_{10}$ of the foregoing formula is desired to be hydrogen atom or a lower alkyl group having 1 to 4 carbon atoms. Preferably $R_{10}$ is a hydrogen atom or methyl group. $R_{20}$ may be a substituted or unsubstituted alkyl group and the number carbon atoms in the alkyl moiety is desired to fall in the range of 1 to 8. When R20 is a substituted alkyl group, the substituent thereof if desired to be hydroxyl group, halogen atom or an amino group (particularly a dialkylamino group).

The atomic group represented by the foregoing formula may form a copolymer with other repeating atomic group to give rise to a varying acrylic resin. Generally, however, the acrylic resin is formed by obtaining a homopolymer or copolymer using at least one atomic group of the aforementioned formula as a repeating unit.

xi) Polyacrylonitrile xii) Acrylonitrile copolymers

Acrylonitrile-vinyl acetate copolymer, acrylonitrile-vinyl chloride copolymer, acrylonitrile-styrene copolymer, acrylonitrile-vinylidene chloride copolymer, acrylonitrile-vinyl pyridine copolymer, acrylonitrile-methyl methacrylate copolymer, acrylonitrile-butadiene copolymer and acrylonitrile-butyl acrylate copolymer.

In this case, the polymerizing ratios of comonomers in these copolymers are optional.

xiii) Diacetone acrylamide polymers

Diacetone acrylamide polymer obtained by the action of acetone upon acrylonitrile.

xiv) Polyvinyl acetate xv) Vinyl acetate copolymers

Copolymers of vinyl acetate with acrylic esters, vinyl ether, ethylene and vinyl chloride.

In this case, the polymerizing ratios of comonomers in these copolymers are optional.

xvi) Polyvinyl ethers

Polyvinyl methyl ether, polyvinyl ethyl ether and polyvinyl butyl ether.

xvii) Polyamides

Ordinary homonylons such as nylon 6, nylon 6-6, nylon 6-10, nylon 6-12, nylon 9, nylon 11, nylon 12, and nylon 13, polymers such as nylon 6/6-6/6-10, nylon 6/6-6/12, and nylon 6-6/6-11, and optionally modified nylons.

xviii) Polyesters

Condensates and copolycondensates of various dibasic acids such as aliphatic dibasic acids like oxalic acid, succinic acid, maleic acid, adipic acid and sebacic acid, and aromatic dibasic acids like isophthalic acid and terphthalic acid with various glycols such as ethylene glycol, propylene glycol, diethylene glycol, tetramethylene glycol and hexamethylene glycol.

Among other condensates and copolycondensates, condensates of aliphatic dibasic acids with glycols and copolycondensates of glycols with aliphatic dibasic acids prove particularly advantageous.

Further, modified Glyptal resins obtained by causing Glyptal resin, a condensate of phthalic anhydride with glycerol, to be esterified with a fatty acid and natural resin are advantageously usable.

xix) Polyvinyl acetal type resins

Polyvinyl formal and polyvinyl acetal type resins obtained by acetylizing polyvinyl alcohols are advantageously usable.

In this case, the acetylizing degrees of polyvinyl acetal type resins are optional.

xx) Polyurethane resins

Thermoplastic polyurethane resins possessing urethane bond.

Among other polyurethane resins, those obtained by the condensation of glycols with diisocyanates and preferably those obtained by the condensation of alkylene glycols with alkylene diisocyanates prove advantageously usable.

xxi) Polyethers

Styrene formalin resin, ring-opened polymer of cyclic acetal, polyethylene oxide and glycol, polypropylene oxide and glycol, propylene oxide-ethylene oxide copolymer and polyphenylene oxide.

xxii) Cellulose derivatives

Nitrocellulose, acetyl cellulose, ethyl cellulose, acetyl-butyl cellulose, hydroxyethel cellulose, hydroxypropyl cellulose, methyl cellulose, ethyl hydroxyethyl cellulose, various esters and ethers of cellulose and mixtures thereof.

xxiii) Polycarbonates

Various polycarbonates such as polydioxy-diphenyl methane carbonate and dioxy-diphenyl propane carbonate.

xxiv) Ionomers

Na, Li, Zn and Mg salts of copolymers of methacrylic acid and acrylic acid with ethylene.

xxv) Ketone resins

Condensates of cyclic ketones such as cyclohexanone and acetophenone with formaldehyde.

xxvi) Xylene resins

Condensates of m-xylene and mesitylene respectively of formalin and modified products of such condensates.

xxvii) Petroleum resins $C_5$ type, $C_9$ type and $C_5$–$C_9$ type copolymers, dicyclopentadiene type resins and copolymers thereof, and modified products of such copolymers.

xxviii) Blends of two or members selected from the foregoing classes i) through xxvii) and blends of such members with other thermoplastic resins.

The molecular weights and other factors of the autoxidizable resins and thermoplastic resins mentioned above may be varied widely.

The recording layer containing the resin and the dye may contain another quencher e.g., one or more of those described in Japanese Patent Application SHO 58(1983)-181,368.

The formation of the recording layer in the recording medium is generally accomplished by applying the prepared compostion to the substrate by any of the known methods.

The thickness of the recording layer so formed is generally in the range of 0.03 to 10 um.

Optionally, the recording layer contemplated by the present invention may additionally incorporate therein another dye, polymer, oligomer, plasticizer, surfactant, antistatic agent, lubricant, flame retardant, stabilizer, dispersant, antioxidant and crosslinking agent.

This formation of the recording layer can be carried out by spreading a mixture containing a dye and a quencher or a mixture containing a dye, a quencher and resin on a substrate by the use of a prescribed solvent and subsequently drying the applied layer of this mixture.

Examples of the solvent usable advantageously for the formation of the recording layer include ketones such as methylethyl ketone, methyl-isobutyl ketone and cyclohexanone, esters such as butyl acetate, ethyl acetate, carbitol acetate and butyl-carbitol acetate, ethers such as methyl cellosolve and ethyl cellosolve, aromatic solvents such as toluene and xylene, halogenated alkyl compounds such as dichloroethane and alcohols.

The dye is generally used in an amount falling in the range of 50 to 100% by weight, preferably 80 to 100% by weight, based on the weight of the resin to be used. Any of a variety of substrates can be employed in the practice of this invention. ceramics and metals.

The shape of the substrate is selected to suit the purpose for which the produced recording medium is used. Thus, the substrate may be in the shape of tape, drum or belt, for example.

The substrate is generally provide with a groove for tracking. Optionally, there may be an undercoat layer such as a reflecting layer, and a heat-storing layer and a light-absorbing layer.

When the substrate is made of a resinous material, the resin may be methacrylic resin, acrylic resin, epoxy resin, polycarbonate resin, polysulfone resin, polyether sulfone or methyl pentene polymers. To fulfil its function, the resinous substrate may be provided or not provided with grooves.

The substrate may be coated with primer for the purpose of acquiring enhanced solvent resistance, wettability, surface tension and thermal conductivity.

Examples of the primer usable advantageously herein- include titanium type, silane type and aluminum type alkoxides, chelated products, and various photosensitive resins.

The recording layer, when necessary, may be coated with a reflecting layer serving as a rear surface when the substrate is made of transparent material or with a surface-protecting layer or half-mirror layer.

The optical recording medium of this invention may have the aforementioned recording medium deposited on one surface thereof or on both of the opposite surfaces thereof. Alternatively, two substrates each having one recording medium deposited on one side thereof may be opposed to each other across a prescribed space, with the recording layers facing each other, sealed in situ and sufficiently air tight to keep the recording layers from dirt and scratches.

The optical recording medium of this invention, while in straight or rotary motion, admits the recording light in pulses. On exposure to the incoming recording light, the dye in the recording layer generates heat and melts itself and the resin to give rise to bits in the recording layer.

The reading of the bits thus formed is effected by keeping the optical recording medium in straight or rotary motion, projecting the reading light upon the recording layer containing these bits, and detecting the light reflected light.

In this case, the recording and reading of information may be performed on the substrate side or on the recording layer side of the medium. In the preferred form of this invention purely by reason of the structure of the medium, the recording and reading of information to be carried out on the substrate side of the medium.

The pits once incised in the recording medium can be erased with light or heat so that the recording medium is readied for repeated use.

As the light for recording or reading, there may be used semiconductor laser, He-Ne laser, Ar laser or He-Cd laser.

The optical recording medium produced by the present invention suffers from the deterioration by reading due to repeated exposure to the reading light only minimally.

It enjoys notably improved stability to withstand light and experiences little degradation of quality while in storage in a bright room.

When pits are alternately formed and erased, the properties of the medium are affected only to the minimal extent. Moreover, the sensitivity of writing is degraded sparingly.

In this case, since the dye cation and the quencher anion are united by ionic bond in the photostable dye of this invention, the effect the photostable dye is enabled to manifest is much greater than when the dye and the quencher are used as a mere mixture.

Further, the recording layer formed of the photostable dye of this invention permits the writing and reading of information to be effectively carried out with the light passed through the transparent substrate without requiring interposition of any extra reflecting layer.

Moreover, the dye possesses high solubility and yields minimally to crystallization.

Now, the optical recording medium of this invention will be described more specifically below with reference to working examples.

EXAMPLE 36

Various media were obtained by dissolving a varying dye D shown in Table 1 in a prescribed solvent and applying the resultant solution in a thickness of 0.06 μm on a disk substrate of acrylic resin 30 cm in diameter on which an undercoat layer (0.01 μ) had been formed in advance thereon by applying a titanium chelate compound (T-50 produced by Nippon Soda Co.) thereon and subjecting the applied layer of chelate compound to hydrolysis.

In Table 1, NC denotes nitrocellulose having a nitrogen content in the range of 11.5 to 12.2% and viscosity of 80 seconds as measured by the method specified by JIS K-6703. The content of NC was 10% by weight.

Separately, for the purpose of comparison, a medium containing perchlorate of D+ 4 (D'4) and tetrabutyl ammonium salt of Q−1-8 (Q −18) and a medium containing perchlorate of D+ 12 (D'12) and tetrabutyl ammonium salt of Q− 1-12 (Q 1-12) were prepared.

The dyes used herein were those illustrated above in the text as identified with the respective numbers attached thereto.

The media thus prepared were each rotated at 900 rpm and, in the meantime, writing of information thereon was effected with the semiconductor laser beam (830 nm) projected thereto from the rear face side of the substrate. In this case, the output at the focussing unit was 10 mW and the frequency was 2 MHz.

Subsequently, with the semiconductor laser beam (830 nm, the output at the focusing unit at 1 mW) used as the read light, the beam reflected through the substrate was detected and tested for C/N ratio at a band width of 30 KHz with the aid of a spectrum analyzer made by Hewlett-Packard Corp.

Then, each sample medium was held stationarily and exposed for five minutes to read light of 1-mW laser emitted in pulses of 3 KHz and a width of 1 μ.sec, subsequently left standing at 40° C. and 88% RH for 1500 hours, and tested for variation (%) in reflectance of the read light passed through the substrate.

The results are shown in Table 1.

TABLE 1

| Sample No. | Dye | Resin | C/N ratio (dB) | Variation in deterioration by reading or reflectance (%) | Variation in reflectance (%) |
|---|---|---|---|---|---|
| 1 | D 1 | — | 50 | −4 | −5 |
| 2 | D 14 | — | 49 | −3 | −4 |
| 3 | D 2 | — | 49 | −4 | −5 |
| 4 | D 3 | — | 51 | −4 | −5 |
| 5 | D 4 | — | 50 | −4 | −5 |
| 6 | D 5 | — | 48 | −4 | −5 |
| 7 | D 8 | — | 48 | −3 | −5 |
| 8 | D 9 | — | 49 | −3 | −5 |
| 9 | D 6 | — | 50 | −3 | −4 |
| 10 | D 7 | — | 48 | −4 | −6 |
| 11 | D 10 | — | 48 | −4 | −5 |
| 12 | D 11 | — | 47 | −3 | −5 |
| 13 | D 12 | — | 49 | −4 | −5 |
| 14 | D 16 | — | 50 | −4 | −5 |
| 15 | D 18 | — | 48 | −2 | −3 |
| 16 | D 19 | — | 48 | −4 | −5 |
| 17 | D 3 | NC | 48 | −4 | −6 |
| 18 (Control) | D'4 + Q 1-8 | — | 48 | −8 | −10 |
| 19 (Control) | D'12 + Q 1-12 | — | 47 | −8 | −9 |

EXAMPLE 37

Various optical recording media were obtained by following the procedure of Example 36, using a varying dye indicated in Table 2.

Separately, for the purpose of comparison, a medium containing perchlorate of D+ 55 (D' 55) and tetrabutyl ammonium salt of Q− 1-8 (Q18) and a medium containing perchlorate of D+ 53 (D' 53) and tetrabutyl ammonium salt of Q− 1-8 (Q− 1-8) were prepared.

The various optical recording media so obtained were tested by following the procedure of Example 36. The results were as shown in Table 2.

TABLE 2

| Sample No. | Dye | Resin | C/N ratio (dB) | Variation in deterioration by reading or reflectance (%) | Variation in reflectance (%) |
|---|---|---|---|---|---|
| 20 | D 65 | — | 50 | −0.5 | −2 |
| 21 | D 69 | — | 53 | −1.0 | −1 |
| 22 | D 66 | — | 50 | −0.5 | −2 |
| 23 | D 67 | — | 51 | −0.5 | −2 |
| 24 | D 68 | — | 50 | −1.0 | −1 |
| 25 | D 70 | — | 54 | −0.5 | −1 |
| 26 | D 71 | — | 52 | −1.0 | −2 |
| 27 | D 72 | — | 51 | −1.5 | −2 |
| 28 | D 73 | — | 51 | −0.5 | −1 |
| 29 | D 74 | — | 52 | −0.5 | −1 |
| 30 | D 75 | — | 52 | −1.0 | −2 |
| 31 | D 76 | — | 50 | −0.5 | −1 |
| 32 | D 77 | — | 52 | −1.0 | −2 |
| 33 | D 79 | — | 51 | −0.8 | −1 |
| 34 | D 80 | — | 53 | −0.8 | −2 |
| 35 | D 70 | NC | 53 | −0.8 | −2 |
| 35 (Control) | D'67 + Q 1-8 | — | 51 | −2.0 | −5 |
| 36 (Control) | D'65 + Q 1-12 | — | 50 | −2.5 | −6 |

What is claimed is:

1. An optical recording medium of the heat mode comprising a substrate and a recording layer thereon wherein information is recorded by recording light and sensed by reading light, said recording layer comprising a photostable ionically bonded single salt between a cyanine dye cation and a quencher anion having the general formula (I) or (II):

$$\phi^+ - L = \Psi \cdot Q^- \qquad (I)$$

$$\phi = L - \Psi^+ Q^- \qquad (II)$$

wherein

φ and Ψ each are a residue of a heterocyclic ring forming the cyanine dye;

L is a polymethine linking radical forming the cyanine dye, and

Q− is a quencher anion;

said photostable ionically bonded single salt being obtained by reacting a cyanine dye represented by the general formula IV or V and a quencher represented by the formula VI $$\phi^+ - L = \Psi \cdot An^- \qquad (IV)$$

$$\phi = L - \Psi^+ \cdot An \qquad (V)$$

$$Q^- \cdot Cat+ \qquad (VI)$$

wherein φ, Ψ, L and Q− have the same meanings as defined above, An− denotes an acid anion, and Cat+ denotes an alkali metal cation or onium cation and then isolating said single salt.

2. The optical recording medium of claim 1 wherein φ and Ψ each are a mono- or divalent resident of a thiazole ring, oxazole ring, selenazole ring, imidazole ring, pyridine ring, or indolenine ring, which rings may have an aromatic ring fused thereto.

3. The optical recording medium of claim 1 wherein $Q^-$ is a transition metal chelate compound anion.

4. An optical recording medium of claim 3 wherein the anion has the general formula (III):

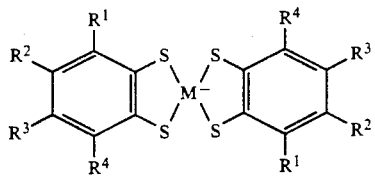

wherein M is a transition metal atom, $R^1$, $R^2$, $R^3$ and $R^4$ are independently selected from the group consisting of hydrogen, halogen atoms, alkyl radicals, and dialkylamino radicals.

5. The optical recording medium of claim 1 wherein said recording layer further comprises a resin.

6. The optical recording medium of claim 1 wherein the dye cation is attached to the resin.

7. The optical recording medium of claim 1 which further comprises an undercoat layer between said recording layer and said substrate.

8. A optical recording medium as in claim 1 wherein $Q^-$ is an anion represented by the general formula III

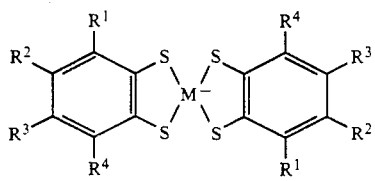

wherein M denotes a transition metal atom, $R^1$, $R^2$, $R^3$, and $R^4$ each denote a hydrogen atom, a halogen atom, an alkyl group, or a dialkylamino group; wherein $\phi$ and $\Psi$ are radicals represented by the following general formulas:

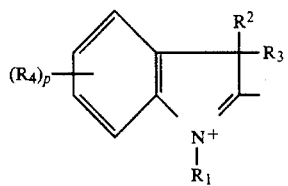  [φI]

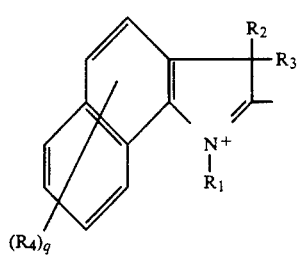  [φII]

-continued

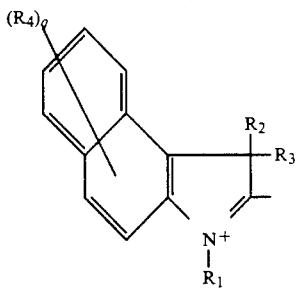  [φIII]

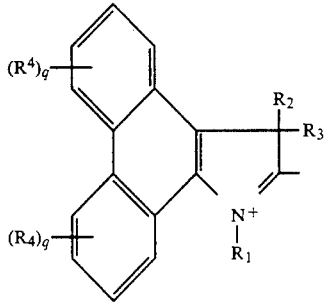  [φIV]

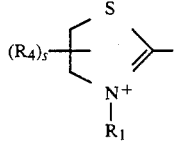  [φV]

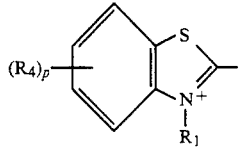  [φVI]

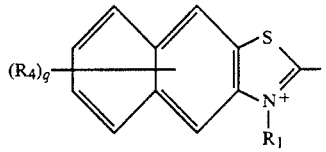  [φVII]

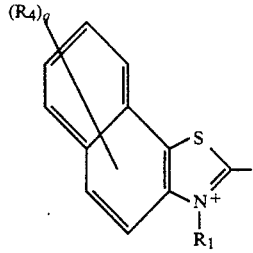  [φVIII]

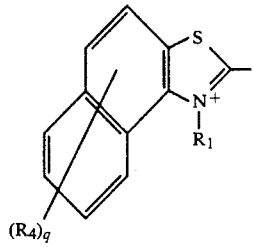  [φIX]

5,219,707
41
-continued
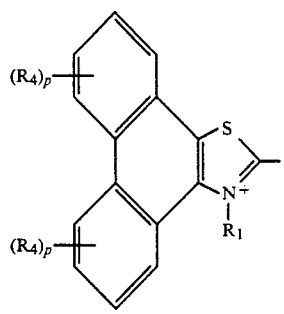 [φX]
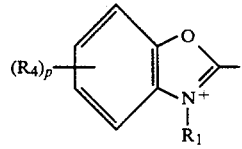 [φXI]
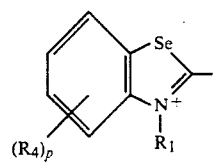 [φXII]
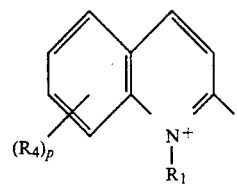 [φXIII]
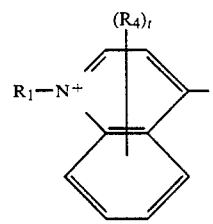 [φXIV]
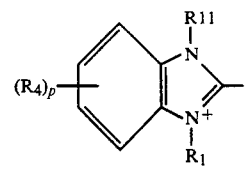 [φXV]
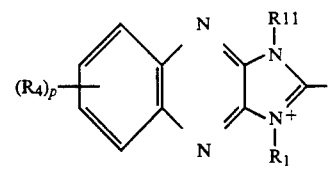 [φXVI]
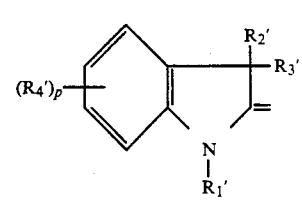 [ΨI]
42
-continued
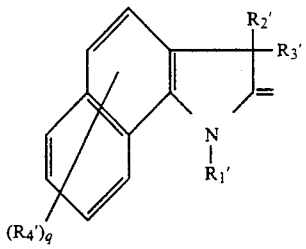 [ΨII]
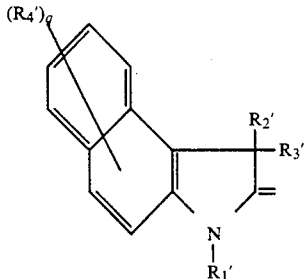 [ΨIII]
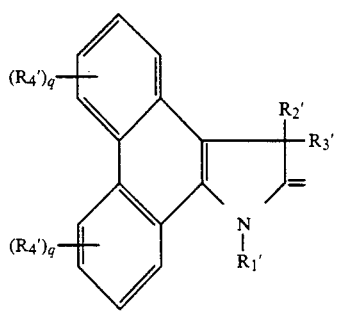 [ΨIV]
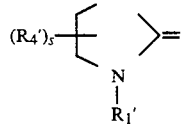 [ΨV]
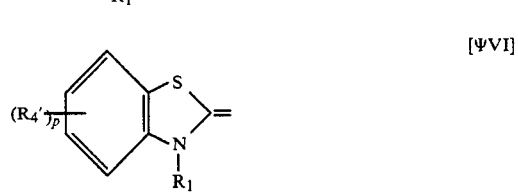 
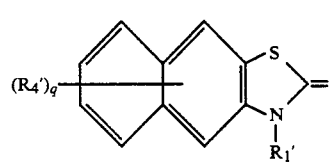 [ΨVI]
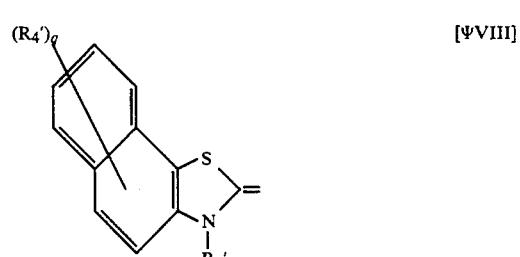 [ΨVII]
[ΨVIII]

[ΨIX]
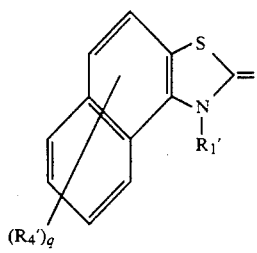

[ΨX]
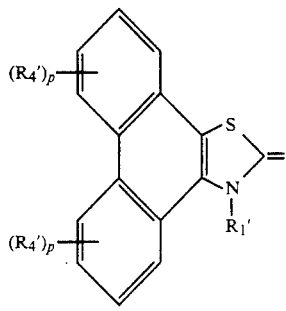

[ΨXI]
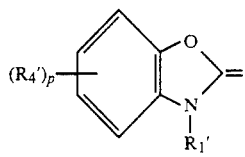

[ΨXII]
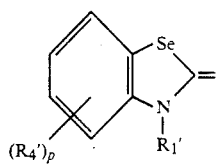

[ΨXIII]
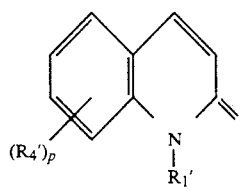

[ΨXIV]
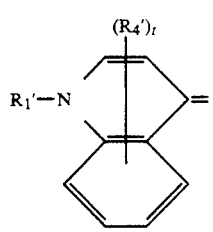

[ΨXV]
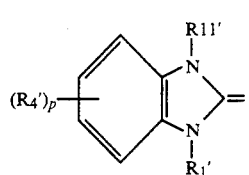

[ΨXVI]
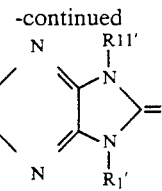

in which $R_1$, $R_1'$, $R_{11}$ and $R_{11'}$, each represent a substituted or unsubstituted alkyl, aryl or alkenyl group; $R_2$ and $R_3$ represent and alkyl or aryl group; $R_4$ and $R_{4'}$ represent one or a plurality of groups which may be the same or different and are selected from the group consisting of alkyl, aryl, heterocyclic, halogen, alkoxy, aryloxy, alkylthio, arylthio, alkylcarbonyl, arylcarbonyl, alkoxycarbonyl, aryloxycarbonyl, alkylcarbonyloxy, arylcarbonyloxy, alkylamide, arylamide, alkylcarbamoyl, arylcarbamoyl, alkylamine, arylamino, carboxylic, alkylsulfonyl, arylsulfonyl, alkylsulfonamide, arylsulfonamide, alkylsulfamoyl, arylsulfamoyl, cyano and nitro; p, q, r, s and t are integers from 0 to 4; and L is a polymethine connecting group represented by the general formulas:

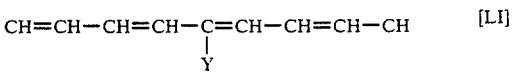 [LI]

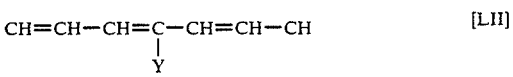 [LII]

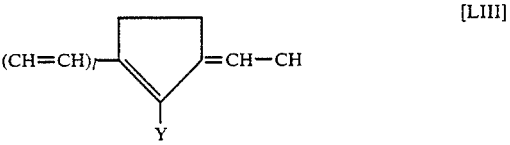 [LIII]

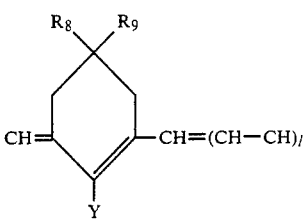 [LIV]

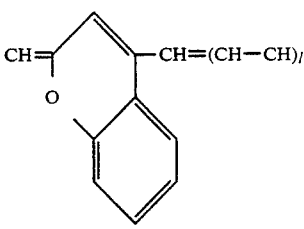 [LV]

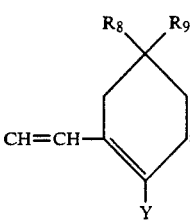 [LVI]

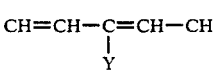 [LVII]

-continued

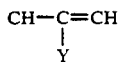  [LVIII]

  [LIX]

wherein y is hydrogen or a monovalent radical selected from the group consisting of lower alkyl, lower alkoxy, di-lower alkylamino, diphenylamino, lower alkyl-phenylamino, morpholino, imidazolino, ethoxycarbonyl-piperazino, alkylcarbonyloxy, alkylthio, nitro, and halogen, $R_8$ and $R^9$ are hydrogen or lower alkyl; and l is the integer 0 or 1.

9. An optical recording medium of claim 1 wherein the recording layer has a thickness of 0.03 to 10 um.

10. An optical recording medium of claim 1 wherein said recording layer is substantially free of acid anions and of metal or onium ions.

11. An optical recording medium according to claim 1 wherein L is a polymethine connecting group for the formation of a mono-, di-, tri- or tetra-carbocyanine dye.

12. An optical information recording medium capable of recording information and regenerating the information with light comprising a substrate and a recording layer said recording layer consisting essentially of at least one single salt of an organic dye cyanine cation and a quencher anion.

* * * * *

UNITED STATES PATENT AND TRADEMARK OFFICE
CERTIFICATE OF CORRECTION

PATENT NO. : 5,219,707

DATED : June 15, 1993

INVENTOR(S) : Kenryo Namba

It is certified that error appears in the above-identified patent and that said Letters Patent is hereby corrected as shown below:

On title page, item [30]

Foreign Application Priority Data

```
change "Jan. 12, 1983" to read --Dec. 1, 1983--
change "Jan. 12, 1983" to read --Dec. 1, 1983--
change "Mar. 2, 1984" to read --Feb. 3, 1984--
change "Apr. 2, 1984" to read --Feb. 4, 1984--
```

In the claims

Column 38, line 55 change " $\phi = L - \psi^+ \cdot An$ " to read -- $\phi = L - \psi^+ \cdot An$ --

Column 38, line 59 change " $Q^- \cdot Cat+$ " to read -- $Q^- \cdot Cat^+$ --

Column 38, line 61 change "$Cat+$" to read --$Cat^+$--

Column 38, line 65 change "resident" to read --residue--

Column 44, line 3 change "and" to read --an--

UNITED STATES PATENT AND TRADEMARK OFFICE
CERTIFICATE OF CORRECTION

PATENT NO. : 5,219,707
DATED : June 15, 1993
INVENTOR(S) : Kenryo Namba

It is certified that error appears in the above-indentified patent and that said Letters Patent is hereby corrected as shown below:

Column 45, line 6 change "$R^9$" to read --$R_9$--

Signed and Sealed this

Twelfth Day of April, 1994

*Attest:*

BRUCE LEHMAN

*Attesting Officer*   *Commissioner of Patents and Trademarks*